United States Patent [19]
Keret

[11] Patent Number: 5,386,362
[45] Date of Patent: Jan. 31, 1995

[54] MANAGEMENT SYSTEM FOR COIN OPERATED LAUNDRY MACHINES

[75] Inventor: Jacob Keret, Tel-Aviv, Israel

[73] Assignee: Set-O-Matic, Inc., Farmingdale, N.Y.

[21] Appl. No.: 18,189

[22] Filed: Feb. 16, 1993

[51] Int. Cl.⁶ .................. G05B 11/01; G06F 15/00
[52] U.S. Cl. .................... 364/406; 364/146; 364/188; 364/479; 340/825.35
[58] Field of Search .......... 364/401, 479, 406, 918.51, 364/146, 140, 189, 188, 138; 340/825.35; 307/38

[56] References Cited

U.S. PATENT DOCUMENTS

| | | | |
|---|---|---|---|
| 4,216,481 | 8/1980 | Werth et al. | 364/479 |
| 4,267,915 | 5/1981 | McLaughlin . | |
| 4,272,757 | 6/1981 | McLaughlin . | |
| 4,306,219 | 12/1981 | Main et al. | 340/825.54 |
| 4,369,442 | 1/1983 | Werth et al. | 340/825.35 |
| 4,520,451 | 5/1985 | McLaughlin | 364/900 |
| 4,636,963 | 1/1987 | Nakajima et al. | 364/479 |
| 4,663,538 | 5/1987 | Cotton et al. | 307/38 |
| 5,109,972 | 5/1992 | Van Horn et al. | 194/217 |
| 5,299,113 | 3/1994 | England et al. | 364/146 |

*Primary Examiner*—Gail O. Hayes
*Assistant Examiner*—Jennifer L. Hazard
*Attorney, Agent, or Firm*—Charles E. Temko

[57] ABSTRACT

A management system for coin operated laundry machines at individual locations, the system including data transfer means at each machine, a hand held terminal for receiving and transmitting data, in which each machine includes a circuit board interconnecting coin collecting means and operational circuits, the circuit board having storage facilities for both operational parameters and coin auditing data, the hand held terminal having means for transmitting information serving to vary any of the operational parameters and for receiving data associated with coin collection.

2 Claims, 15 Drawing Sheets

MANAGEMENT SYSTEM FOR COIN OPERATED LAUNDRY MACHINES

BACKGROUND OF THE INVENTION

This invention relates generally to the field of coin operated devices which either render services or vend goods in exchange for change deposited into the device, more particularly to an improved control system particularly adapted for use by commercial laundromat operators who require a control system capable of managing plural numbers of both washers and dryers in each of plural locations. Systems of this general type are known in the art, and the invention lies in the provision of specific constructional details which provide control functions heretofore unavailable with respect to data parameters, the use of which is directed to either type of coin operated device.

SUMMARY OF THE INVENTION

Briefly stated, the invention contemplates the provision of an improved management system particularly adapted for the management of multiple laundry machine sites by controlling and monitoring the use of individual coin operated washers and dryers and centralizing information and money collection. In keeping with these objects, the system controls each laundry machine with a programmable parameter. These parameters determine, inter alia individual machine cycle times and price, as well as perform the usual functions of recording the known operations of coin collection, number of cycles, unauthorized events and the like.

Each machine is individually tracked with respect to the date and timing of the last date of collection, the number of coins received since the last collection, and the number of cycles performed since the last collection, the accumulated machine cycle time in the last collection, the date and time the service door is opened, the date and time when the coin vault is opened, again as is known in the art. Data is transferred from each machine by a hand-held computer terminal for transfer to a central office computer.

In addition, novel means is provided for controlling the time cycles of both washers and dryers which are normally controlled by manual timers contained within the machine, and are substantially unadjustable. This permits the operation of each individual machine to be tailored to the requirements of users at a particular site, where individual needs often vary substantially from the needs of other users at other locations. The means includes a standard circuit board installed inside the laundry machine between the mechanical coin collector and the already present controls of the machine in order to control operations in accordance with its own stored parameters. These parameters may be changed at will by inputting information from the hand-held terminal. The same hand-held terminal also serves as the data collecting device.

The circuit board or "card" also provides continuous feedback information with respect to what is happening during a cycle via a three digit LED display seen by a customer through a small window. When the card is on and awaiting input, the LED is lit and indicates the number of coins required to start the machine cycle. With each coin deposited, the LED counts down to "1" and then indicates that the cycle has begun. For washers, the word "on" is displayed with a flashing signal to indicate operation. For dryers, the same flashing signal indicates the dryer cycle has started, and a number indicates the minutes remaining in that cycle. The machine counts down during operation enabling the user to utilize the remaining time for other purposes.

BRIEF DESCRIPTION OF THE DRAWINGS

In the drawings, similar reference characters have been employed to designate corresponding parts throughout the several views.

FIGS. 10 through 15, inclusive, are flow charts showing computer programs utilized by the embodiment.

DETAILED DESCRIPTION OF THE DISCLOSED EMBODIMENT

Figure 1:
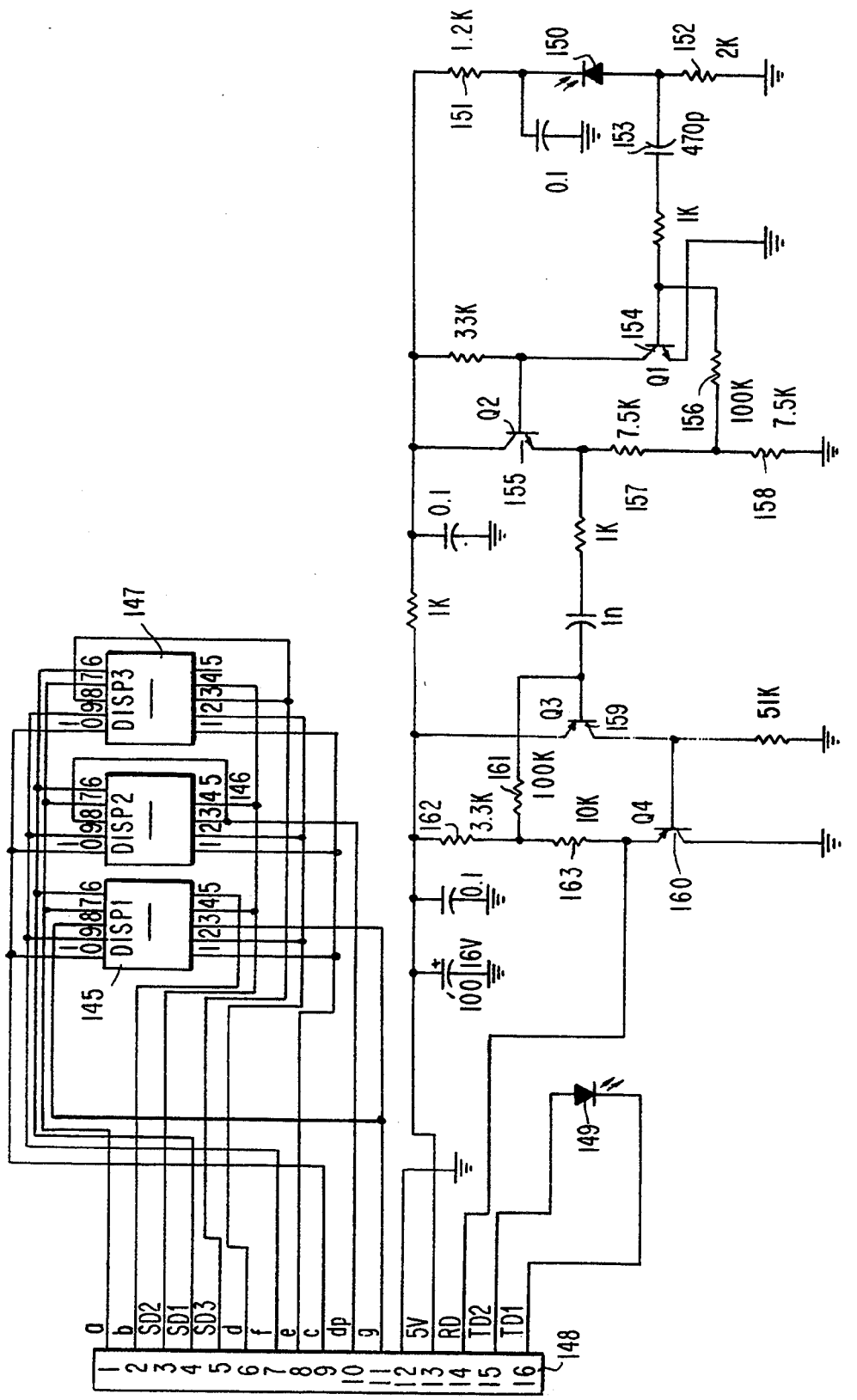
FIG. 1 is a schematic electrical diagram of a communication and display Unit forming a part of the embodiment.

Before entering into a detailed discussion of the structural aspects of the embodiment, a summary of the operation of the device is considered apposite.

In accordance with the invention, data is compiled at a centralized location using a standard PC-based computer system. A small hand-held terminal is used to collect data from machines and to update machine parameters. The hand-held terminal connects to the machine interface card using a removable optical sensor or to the central PC with an RS-232 serial communications cable. The hand-held terminal consists of a small screen displaying up to 16 lines of information including menus and instructions from the central PC. The screen may be backlit for use in dim light by pressing the L key on the keyboard. The L key is not used in any other function.

Below the screen is the keyboard. It has keys for the letters of the alphabet, keys for the number 0–9, and a number of special function keys. The unit is turned on by pressing the key labeled pwr (power). To turn the Unit off, the same key is pressed again. An audible signal indicates that the unit power has been turned off, and the screen goes blank. When turned on, the unit automatically starts up the control program presenting a menu of options. To select an option, a key is pressed indicating that option. For example, to collect date from a machine, the C key is pressed on the terminal. Once the unit has been turned on, pressing a key results in an audible click to indicate that the key selection is registered. The hand-held terminal is powered by a rechargeable battery. There is a battery-saving feature which shuts the unit off when no key is pressed for approximately 30 seconds. When the battery is low, the unit automatically notifies that recharging is necessary. When the battery is nearly exhausted, the unit notifies again that it is in urgent need of recharging. The terminal memory is protected from data loss by a lithium battery. This insures data retention even if the main battery fails.

Each hand-held terminal has a unique ID number. This number is logged by the Control Program when data is transmitted to a central PC. The terminal also has a built-in clock used for logging the time that data is collected from machines and has 64K RAM of memory for data storage. This is enough to store data from up to 1000 machines without the need to transfer data to the central PC. When data is transferred to the PC, the hand-held terminal clears its memory of data automatically. For connection to other components in the system, a standard RS-232 communications port (25 pin) is used. It is located at the top of the unit. Parameters and data are sent or received depending upon the terminal option selected. Connection to the card in the machine is by means of a removable optical sensor unit that plugs into the hand-held terminal communications port.

Management Control Program

A control program is a major component of the system. It is used to coordinate data gathered from the other components; e.g. the card and the hand-held terminal, and to manage the system from a central PC. The program and its related parts may be supplied on an MS-DOS diskette.

The following are the minimum requirements for operating the management control program:

Any computer that is IBM-PC compatible including PC, PC-XT, and AT-286 or AT-386 machines.
RAM space of 256K or more.
MS-DOS version 3.2 or later.
Any video display adapter: Mono, Hercules, CGA, EGA, or VGA.
One floppy diskette drive that reads standard 360K 5.25 inch diskettes. An additional floppy disk drive, or a hard disk is recommended.
A standard serial communications card interface with an RS-232 port.

Program disk space requirements are minimal, with less than half of a standard 360K diskette taken up by the control program files. The rest of the room on the diskette is used for data storage. Data is recorded to the same subdirectory from which the programs are run. The management control program checks for space before writing data to the disk.

General Workflow

Before the system can be put into operation for machine control and data tracking, information must be entered into the system by the PC operator and support personnel. This includes information on company locations centralized at the PC and control parameters which are recorded at the PC and maintained at each machine. The PC operator uses the management control program to record information on company location. This information will be used in the generation of summation reports. The operator then defines machine parameter classes according to management specified parameters for different machines. The parameters Control the cost Of using individual machines and the length of machine cycles. Finally, the operator transmits the parameter classes to the hand-held terminals used to set up the machines The support personnel use the hand-held terminals to individually set up the card interface of each machine to control the use of that machine. This initialization procedure is identical to updating at periodic intervals. Each machine is tracked via an 8-digit number support personnel assign a number based upon the machine location, its position within a site location, and whether it is a dryer or a washer. The machine is also assigned a parameter class to control its operation.

Once machines have been initialized, collectors periodically collect the cash in each machine and receive the data relative to that machine. The hand-held terminal is used to record the data from each machine. Collected money and the hand-held terminal are turned in at the central PC location.

The PC operator then transmits all the Collected data from the hand-held terminals to the PC. The PC operator may query the data for specific machine information. Alternatively, the operator can print a report which summarizes the collected data. As a result of data analysis, management may decide to change pricing structures, machine operations, service machines, or change machine locations. Information and parameters may be updated using the management control program, and then transferred to the hand-held terminals for updating the machines.

Using the Hand-Held Terminal

To access program options, the hand-held terminal is actuated. This is done by pressing the key labeled PWR. The following menu appears on the screen:

| COIN DATA LOGGING SYSTEM |
| --- |
| machine options: |
| (C)ollect data |
| (U)pdate data |
| (S)top cycle |
| (D)iagnostics |
| PC options: |
| (T)ransmit data |
| (R)eceive parameters |

The first set of options apply to the machine card interface. The second Set of options apply to the PC. To select an option, the key indicated in parentheses is pressed.

The program parameters are the key to controlling the machines within the system. The parameters may be updated from the parameter information stored in the PC or independently by a terminal operator in the field. The service operator can adjust parameters as needed directly and need not return to the PC to obtain new parameters. Parameters are set in conjunction with an individual machine coded ID number. Because this number depends only on physical factors (location, machine type and position), it is not Set centrally at the PC. Machine ID's are relayed to the central PC during data collection, but are determined only by the service personnel in the field via the hand-held terminal. The machine ID number is shown by the management control program as an eight-digit number. This is made up of three items:

| | |
| --- | --- |
| Location number | A four digit number (leading zeros are filled). The first four digits of the machine ID identify the company site where the machine is located. |
| Machine type | A single digit: 1 for washers or 2 for dryers. No other machine types are allowed in this version of the system. This is the fifth digit of the machine ID. |
| Position number | A three digit number (leading zeros are filled). The last three digits of the machine ID identify the position of the machine at the site. | means that the machine is located at site number 5400, is a dryer (2), and is in position 15.

To update machine parameters, first choose the Update parameters option on the menu of the hand-held terminal (pressing the U key). After selecting this option, the following screen is displayed:

| UPDATE PARAMETERS | |
|---|---|
| Class (1-9): | 1 |
| Drop/Slide coins: | D |
| Location No.: | 0000 |
| Washer/Dryer: | W |
| Position No.: | 000 |

The fields on this screen are arranged for easy multiple updates. Fields at the top are usually changed least often, and the last fields (especially the Position field) are changed most often.

Several of the hand-held terminals function keys have been discussed previously. While using the Update option, parameter fields are displayed, and a number of function keys assist in entering information.

| | |
|---|---|
| Up and Down arrows | These keys are marked by directional triangles. They are used to move the cursor from field to field. |
| Backspace | This key is labeled BKSP. Use this key when the cursor is in a field that accepts more than one character as input, to erase and correct entered characters. |
| Escape | This key is labeled ESC. Its use depends upon where the cursor is located. If the cursor is in the first position of a field, pressing this key leaves the current screen and returns to the screen previously displayed. If the cursor is in a multiple character field and not at its first position, pressing this key clears the field and moves the cursor to the first position. |
| Enter | This key is labeled ENTER. It accepts the entered input and moves to the next field. Where there is no next field on the screen, pressing this key processes the input of the screen. |

In each field, the appropriate information is supplied. After the last field is filled in, press the ENTER key and the following message appears:

"Transmit (Y/N)"

Indicate "yes" by pressing the Y key. Any other key is equivalent to "no". If indicated "no", it is possible to move the cursor to any field and make further changes.

The fields on the Update screen are as follows:

| | |
|---|---|
| Class | This field accepts a number from 1 to 9. This corresponds to one of nine user-defined parameter classes. Class "1" is the default value. If the indicated class number is accepted, press the down arrow key to move the cursor to the next field. Parameter classes are normally defined at the PC and loaded into the hand-held terminal. If one enters a value for a class, then the change class screen appears showing the corresponding stored parameters. One can then alter the class parameters directly at the terminal as needed. When one enters a value for class on the update screen, this number is kept as the default value for the next update until return to the menu. |
| Drop/Slide Coins | This field accepts only the letter "D" or the letter "S" to indicate whether the machine is accepting coins using a drop mechanism or a |

-continued

| | |
|---|---|
| | coin slide device. This information is used by the card to register how the coins are accepted. |

The next three fields accept input used to make up a unique ID number for the machine.

| | |
|---|---|
| Location No. | The site location code. This is an optional field. If no information is entered, a Location number of "0000" is the default value. This would be the case if the company does not wish to distinguish between locations or if there is only one physical location for the machines under control of the system. When one enters a value for location on the Update screen, this number is kept as the default value for the next update until return to the menu. |
| Washer/Dryer | The type of machine: W for washer, and D for dryer. If nothing is entered, the default type is "washer". |
| Position No. | The position at the site where the machine is located. This number should be unique for any given location code. A position number is required. There is no default value for this field. |

Parameter Classes

Up to nine user-defined parameter classes may be set. These are used to group machine operations. Classes may be defined at the PC and transferred to the hand-held terminals. The terminal operator may, if required, change the definitions of classes directly before updating a machine parameter, Each class includes three parameters:

| | |
|---|---|
| Number of coins | The number of coins required to begin a machine cycle. Coins are assumed to be all of the same value. |
| Operating time | The number of time units for the machine cycle. The units for this parameter vary depending upon the type of machine: For washers, each unit equals 10 seconds. For dryers, each unit equals 1 minute. |
| Cooling time | The length of the cooling cycle for dryers only. The parameter is ignored if the machine is a washer. Units for this parameter are minutes. |

Altered parameter classes may be saved in the terminal for future use. One may save the parameters whenever desired after leaving the update option. If it is indicated that the changes are not to be saved, then the changes made are retained only until return to the menu. If indicated that one does want to save changes, then the terminal will store them in its memory for future use.

Parameters changed at the hand-held terminal may optionally be saved, but they are not automatically transferred to the PC. If new parameters are to be used throughout the whole system, they must be defined at the central PC and loaded into all hand-held terminals in use. It is important to stress that the transfer of information in the system is always one-way. While data moves from the machine to the hand-held terminals, and from the terminal to the. PC, parameters move only in the opposite direction: from the central PC to the hand-held terminals and from the terminals to the machine card interfaces.

As stated above, when entering a value in the Class field of the Update screen, the Change Class screen is displayed:

CHANGE CLASS
Class No.:
Number of coins:
Operating time:
Cooling time:
(press ENTER to accept)

The selected class number is displayed, and its stored parameters are shown. Pressing the ENTER key accepts the stored parameters. The display returns to the Update screen. Pressing any other key places the cursor at the first of the parameters and one can then alter any or all of them. After the changes have been made the following message appears:

"Save Changes (Y/N)?"

To indicate "yes" press the Y key. Any other key is equivalent to "no". After the answer, the screen display returns to the Update screen.

Transmitting Parameters to the Machine

After filling in the Update screen and responding "yes" to the prompt "Transmit ? (Y/N)", the following message appears:

"Sending Parameters"

If the parameters are successfully updated in the machine's interface card, then the following verification message appears on the terminal screen:

"Parameters Sent"

The cursor remains in the last field of the Update screen following the transmit operation. This makes updating of multiple machines of the same type at the same location very easy. It is necessary only to enter the new position number and transmit again. One can verify new parameters by simply starting a machine cycle to see if operation is as expected. Insert the proper number of coins in the machine to start the cycle. As it is usually not necessary to let a test cycle run to completion, an option is provided to interrupt a machine cycle. The Stop Cycle option is seen on the menu of the hand-held terminal. To use this option simply point the terminal's optical sensor at the LED, window and press the S key. Any currently executing cycle is terminated, and the machine is reset and ready to start a new cycle. The LED display again indicates the number of coins required. Note that it is not necessary to stop a machine that is operating to update its parameters or to collect data. Transmissions to and from a machine with the hand-held terminal can occur while the machine is operating. An update will not affect the cycle currently in progress; its parameters take effect only for the next cycle.

Collecting Data from Individual Machines

Collecting the data from individual machines is a very simple procedure. One selects the Collect data option from the hand-held terminal menu. The message "Press any key" is displayed so that one may align the optical sensors before data transmission begins. Once a key is pressed, the following message appears:

"Receiving data"

If the data transfer was successful, then the following message appears:

"Data received"

The machine card interface also provides, feedback during data transfer. During transmission the LED displays:

"-S-"

This indication is usually so brief as to go unnoticed. However, if transmission is interrupted for any reason and not completed, the indication remains to show that there was a problem completing the transmission. Following successful transmission the LED displays:

"- - -"

This is displayed only for a moment.

Transmitting Collected Data to the PC

To transmit information Via the hand-held terminal to the PC, the following procedure is followed:

1. Connect the RS-232 port on the terminal to the communications port on the back of the PC using a cable.
2. Select the Transmit option on the PC management control program menu prior to the next step. Wait for the communications program to display the prompt "Ready".
3. Select the Transmit data option on the hand-held terminal menu.

At this point one can interrupt or stop the transmission only from the PC side. The Esc key on the PC will interrupt the PC communications, and the hand-held terminal will sense the interruption and time out after a few seconds, halting its transmission. When a data transmission has been successful, the hand-held terminal memory is cleared of data automatically to be ready for the next data collection.

Receiving Parameter Information from the PC

To receive parameters at the hand held terminal from the PC use the following procedure:

1. Connect the RS-232 port on the terminal to the communications port on the back of the PC.
2. Select the Transmit option on the PC Control Program menu prior to the next step. Wait for the control program to display the prompt "Ready".
3. Select the Receive parameters option on the hand-held terminal menu.

Once the parameters are successfully received by the hand-held terminal, the following message is seen:

"Sending Received" One can interrupt or stop the transmission only from the PC side. The Esc key on the PC will interrupt the PC communications, as explained in the Transmit parameters option above. However transmission of parameters is so brief that it is concluded in a few seconds.

Terminal Error Messages—PC options

Any of the following error messages may be displayed if communication between the hand-held terminal and the PC fails:

"No data to Send:" One selects the "Transmit data" option and the hand-held terminal has no machine data stored in its memory.

Connect the terminal to PC: The RS-232 cable is not connected or improperly connected at either end.

"Received failed" or "Transmit failed:" One of these messages is displayed if something causes a bad transmission. It is most often caused by selecting either transmit or receive on the hand-held terminal before the control program displays its "Ready" prompt.

Centralized Data Storage—the PC in the management control system

The PC centralizes all stored information (data, control parameters, and company locations) in the system. This information is handled by the Control Program which controls receiving, processing, and reporting data. The PC is a standard IBM compatible system. The system assumes that communications will be via COM1.

One may specify COM2 by creating a setup file for communications is an ASCII text file. The name of this file must be RSCOM.DAT. This file contains the following lines:

comm=2
modeminit=0

The variable "comm" can be 1 for COM1 or 2 for COM2. The variable "modeminit" must be "0" to use the RS-232 cable. Other values for this variable are used for communications through a telephone modem connection. Finally, the Operating system parameters in the CONFIG.SYS file should include the following lines for efficient use of files and buffers:

buffers=20
files=20

When started, the management control program presents a menu of options:

MENU
Transmit to/from terminal
Machine parameters
Location information
Collected data
Report events
Default month/year 01/90
Esc-Quit To select an option, press the first letter (highlighted). For example, to display the Location information, press the L on the PC keyboard.

Select the Transmit option on the management control program menu. Wait for the PC communications program to display the "Ready" prompt. Select the Transmit data option on the hand-held terminal. The management control program displays two windows with this option selected. The upper window displays the "Ready" prompt and other communications messages. The lower window displays the information being transferred and indicates that the communications program is working. While the communications program is active, one may interrupt or stop transmission by pressing the Esc key on the PC. This interrupts PC communications. The hand-held terminal senses the interruption and times out after a few seconds. After transmission to the PC, one may display data on the screen by using the "Collected data" option described below.

Changing Stored PC Information

The management control program stores site location information for the use in summation reports. Site data is not downloaded to the terminal. Use the "Location Information" option to update site location information. When selecting the option, a screen similar to the following appears:

| LOCATION INFORMATION | | |
|---|---|---|
| Location number: | 10 | |
| Address: | 34 Jass Street, Clinton, N.Y. | |
| Machine Type | Price | Number of Machines |
| W | 1.00 | 5 |
| D | 2.75 | 10 |

The screen fields are initially empty. If one wants to examine or edit an existing site location, he enters its number in the "Location number" field and presses the "Enter" key. The system displays the location's information. One may then examine, change, and save the information. To add a new location, enter a new number in the "Location number" field. Then fill in the fields:

| | |
|---|---|
| Location number | Four-digit location code which is part of the machine ID code. |
| Address | Address of the site location. Enter up to 30 characters on this line. |
| Machine Type | Letter identifying the machine type as either "W" for "washers" or "D" for dryers. This field is display-only. The type is entered by the program. |
| Price | Amount charged per machine cycle. Enter digits only; two decimal places are assumed. For example, for a price of $2.50, enter "250". |
| Number of Machines | Number of machines of this type at the machine location. |

Field Input and Editing Keys

While entering and editing field information, one may use these keys to move the cursor:

| | |
|---|---|
| Right arrow | Move one character to the right within a field. |
| Left arrow | Move one character to the left within a field. |
| Down arrow | Move to the next field. |
| Enter | Same as "Down arrow". |
| Up arrow | Move to the previous field. |

To review the list of sites stored in the PC, do not enter a site number in the first field. Press "Esc" or any of the function keys. After editing, other functions can be selected, one of which displays the list.

Special Function Keys

One finishes entering and editing field information by filling all fields in or by pressing the Esc key. One may then use the following function keys:

| | |
|---|---|
| F1 | "Save". This stores the displayed information in the site list. This function key is only available when one has entered information into one or more fields. |
| F3. | "New Information". This clears any displayed information and lets one enter a new location or edit an existing one. |
| F4 | "Delete". If the displayed information was retrieved from the site list, this function key allows one to delete the current site location from the list. This function key is only available when information displayed was retrieved from the list of stored sites. |
| F5 | "List of locations". This displays a list of sites by location number. The site addresses are also displayed for identification. This function key is only available when the fields are empty. |
| Esc | "Quit". Quits the "Location information" option and returns to the management control program menu. |

Changing Machine Information

The management control program defines and stores "user defined" parameter classes to update machine operation. To define, display, and modify classes with the "Machine parameters" option, select this option and a screen similar to the following appears:

| | MACHINE PARAMETERS | | |
|---|---|---|---|
| Class | Number of coins | Operation time | Cooling |
| 1 | 4 | 5 | 0 |
| 2 | 6 | 25 | 3 |
| 3 | 6 | 25 | 2 |
| 4 | 6 | 75 | 3 |

-continued
MACHINE PARAMETERS

| Class | Number of coins | Operation time | Cooling |
|---|---|---|---|
| 5 | 7 | 65 | 1 |
| 6 | 10 | 60 | 1 |
| 7 | 3 | 3 | 0 |
| 8 | 5 | 40 | 1 |
| 9 | 4 | 4 | 0 |

The stored parameter classes, if any, are displayed on the screen. Enter new parameters or change existing parameters as needed. Finish by entering values in all fields or by pressing the Esc key. Use the cursor movements keys to move between the fields. The fields are as follows (all values must be integers):

| | |
|---|---|
| Class | Identifies the number of the parameter class. This number is displayed. Up to nine parameter classes can be defined. |
| Number of coins | Number of coins required to operate a machine cycle. The coins are assumed to be all of the same value. |
| Operation time | Number of time units for the machine's cycle. The units for this parameter vary depending upon the type of machine: For washers, each unit equals 10 seconds. For dryers, each unit equals 1 minute. |
| Cooling time | Time allotted for the cooling part of a dryer cycle. The value entered here has no meaning if the machine type is "washer". Units for this parameter are minutes. |

Special Function Keys

After finishing modifying the class information, choose from among the special function keys highlighted at the bottom of the screen:

| | |
|---|---|
| F1 | "Save parameters". Stores the displayed information in the parameter class list. |
| F3 | "New Information". Clears any editing changes. Then recalls and displays the last stored parameter classes. |
| Esc | "Quit". Quits the Machine parameters option and returns to the management control programs's menu. |

Transmitting Parameters to the Hand-Held Terminal

To transmit parameter class information to hand-held terminals from the PC do the following:
1. Connect the PC to the hand-held terminal using a cable.
2. Select the Transmit option of the Control Program.
3. Wait for the PC communications program to display the "Ready" prompt.
4. Select the "receive" option on the hand-held terminal.

The management control program displays two windows with this option selected. The upper window displays the "Ready" prompt and other communications messages. The lower window displays the parameters being transferred and indicates that the communications program is working.

While the communications program is active one can interrupt or stop transmission by pressing the Esc key on the PC. This interrupts PC communications. The hand-held terminal senses the interruption and times-out after a few seconds.

Viewing the Data

Data is stored by month and year of transmission to the PC. One can view or search the data for any given month. By default, the month and year are the current one, based upon the PC date setting. One can view data from previous months by choosing the option Default month/year. Press the D key. After prompting for the month and year of the data to review, fill in the appropriate month number and the last two digits of the year (for example, enter 12 89 for December 1989. This sets a default value for the transmission date search field (shown below).

Collected Data Option

Collected data is displayed using the Collected data option. Here, the data is presented as a list of transmission records. Each row in the list is a record of the data collected at a specific time for a specific machine. Each record is identified by the following identification fields:
- Date and time data was transmitted to the PC
- ID of the transmitting terminal
- ID of the machine from which data was collected
- Date and time data of collection

Searching the Data

The data stored in the PC is searched using search keys. This is done by filling in any or all of the identification fields. When the Collected data option is chosen, they are displayed as follows:

| Transmission | | Terminal | Machine | Collection | |
|---|---|---|---|---|---|
| Date | Time | number | number | Date | Time |
| _/_/ | _:_ | ___ | ___ | _/_/ | _:_ |

Use the Up and Down arrows to select different fields, and enter the search criteria desired. One may enter multiple search keys by simply entering criteria in several fields. Press the F9 key and the collected data from the specified month will be searched for records that match the criteria. Partial keys will not match; the field contents must match exactly. For example, if the terminal ID is 19872778 then entering "19" or "19872" will not result in a match. Parts of dates (month, day, year), times (hours, minutes), and machine ID numbers (location, type, position) are all separate fields. Therefore if the machine ID is 002318974, then entering "23" in the machine ID (the first of its 3 fields) results in a match.

Data Presentation

Matching data records found are presented with their identification fields filled in as seen in this example:

| Transmission | | Terminal | Machine | Collection | |
|---|---|---|---|---|---|
| Date | Time | number | number | Date | Time |
| 2/20/89 | 11:27 | 19890777 | 43211007 | 12/19/89 | 20:28 |

In addition to the identification fields, each collection displays this information:
- number of coins received
- number of cycles performed
- number of times service door was opened
- number of times coin vault was opened
- number of power interruptions for the machine These fields are displayed as seen in this example:

| Coin recv | Cycl num | Serv open | Cash open | Pwr off |
|---|---|---|---|---|
| 24 | 6 | 2 | 1 | 0 |

One may return to the menu by pressing the Esc key.

One may scroll through the displayed data using the function keys indicated on the screen:

| | |
|---|---|
| Home | Displays the data from the beginning of the list. |
| End | Displays the last page of the data list. |
| PgUp | Displays the previous page (about 15 lines) of data. |
| Up arrow | Scrolls the list 1 line up. |
| Down arrow | Scrolls the data list 1 line down. In addition to the scrolling keys, these other function keys are available: |
| F3 | "Select". Clears the data displayed, and lets one enter new keys for another search of the data. |
| F5 | "Print". Creates from the displayed data a current Information Report for printed output. Only the most current collection of each machine is listed. Earlier data collections may be seen on screen, but are not included in the printed report. See below for a sample report. To file output instead of a printed copy, take the printer off line, or turn it off. Then select this function. The report will then be sent to a disk file called REPORT1.DAT. |
| Esc | "Quit". Quits the Collected data option and returns to the management control program menu. |

Sample Information Report

| | | | | | | | | | | | |
|---|---|---|---|---|---|---|---|---|---|---|---|
| | | | INFORMATION REPORT | | | | | | | | |
| | | | 23:04 Tue Jan 23 | | | 1990 | | | | | |
| | | LOCATION: | 3476 | 14 Tach Street | | Wiscon, CA | | | | | |
| Mach. | Coll. | Collection | | Last coll. | | Coin | Cycl | Oper. | Serv | Vlt | P |
| T Pos | no. | Date | Time | Date | Time | recv | num | Time | Door | Door | O |
| W 008r | 90842 | 1/22 | 14:26 | 1/22 | 8:38 | 5 | 6 | 45 | 2 | 1 | |
| Total | | | | | | 5 | 6 | | | | |
| D-002 | 90777 | 1/22 | 15:08 | 1/22 | 8:38 | 15 | 3 | 9 | 0 | 1 | |
| D 005r | 90842 | 1/22 | 8:38 | 1/22 | 8:38 | 2 | 1 | 40 | 0 | 0 | |
| D 006r | 90842 | 1/22 | 14:04 | 1/22 | 14:04 | 29 | 11 | 69 | 2 | 3 | |
| D 007r | 90777 | 1/19 | 14:06 | 1/19 | 14:06 | 3 | 1 | 4 | 0 | 1 | |
| Total | | | | | | 49 | 16 | | | | |
| Total Coin Count: | | 50 | | | | | | | | | |

The Information Report organizes collected data so that each site data is printed separately. Within each location, washing machines are listed together, then dryers. Totals are tabulated for coins collected for each type of machine, and an overall total is shown. Totals are also tabulated for washer and dryer cycles.

Note the following items in the report:

Each machine is uniquely identified within a location by its position number. The letter "r" may appear after the position number. This indicates that the collection was read during the machine operating cycle. Therefore the reported totals may be inaccurate. Specifically the number of cycles and accumulated times will be lower than expected in relation to the number of coins received.

The collector number is indicated by the last five digits of the terminal ID number. The collector number is unique because all hand-held terminals used by a company have the same first three digits.

The previous collection time and date are shown following a current collection time and date.

The accumulated machine operating time for the current collection is shown following the number of cycles.

Report Events Option

Collected data may be displayed as a list of events. Instead of a list of collections, here one will see the data as a list of events that occurred at specific dates and times at any given machine. As with the previous collection list, each record in the event list is identified by specific identification fields:

Location where the events took place

Type of machines being reported

Machine positions being reported terminals that collected the data

Searching the Data

The data stored in the PC is searched using search keys. This is done by filling in any or all of the identification fields. When the Report events option is, chosen, they are displayed as follows:

Location Type Position Collector

Use the Up and Down arrows to select different fields, and enter the search criteria desired. One can enter multiple search keys by simply entering criteria in several fields. Press the F9 key and the collected data from the specified month will be searched for records that match the criteria. Partial keys will not match; the field contents must match exactly. For example, if the terminal collector ID is 19872778 then entering "19" or "19872" will not result in a match.

Data Presentation

Matching data records found are presented with their identification fields filled in as seen in this example:

| Location | Type | Position | Collector |
|---|---|---|---|
| 3476 | 2 | 005 | 19890842 |
| 3476 | 2 | 006 | 19890842 |
| 3476 | 1 | 008 | 19890842 |

For any particular machine (identified by the first three identification fields), there can be multiple rows. Each row may present up to three different events. The event date and times follow the identification fields. Events are recorded when:

Service door opened

Coin Vault door opened

Machine power failed or turned off

The event fields are displayed as seen in this example:

| Door | Opening | Vault | Opening | Power off | |
|------|---------|-------|---------|-----------|------|
| Date | Time | Date | Time | Date | Time |
| | | | | 1/21 | 17:26 |
| 1/22 | 9:18 | 1/22 | 9:18 | | |
| 1/22 | 10:32 | 1/22 | 9:21 | | |
| | | 1/22 | 14:02 | | |
| 1/22 | 14:25 | 1/22 | 14:25 | 1/22 | 14:25 |

One returns to the menu by pressing the Esc key. One may Scroll through the displayed data using the function keys indicated on the screen:

| | |
|---|---|
| Home | Displays the data from the beginning of the list. |
| End | Displays the last page of the data list. |
| PgUp | Displays the previous page (about 15 lines) of data. |
| PgDn | Displays the next page (about 15 lines) of data. |
| Up arrow | Scrolls the list 1 line up. |
| Down arrow | Scrolls the data list 1 line down. |
| | In addition to the scrolling keys, these other function keys are available: |
| F3 | "Select". Clears the data displayed, and allows entry of new keys for another search of the data. |
| F5 | "Print". Sends an event report of the displayed data exactly as appears on the screen. To file output instead of a printed copy, take the printer off line, or turn it off. Then select this function. The report will then be sent to a disk file called REPORT2.DAT. |
| Esc | "Quit". Quits the Report events option and returns to the management control program's menu. |

Initial Supplied Management Control Program Files

| | |
|---|---|
| CDL.EXE | This is the main part of the management control program. It displays program options and coordinates the other program parts. |
| LOCATION.EXE | This part displays and updates the site information. It builds and manages a location database in a file LOCATION.GLB. It also creates a list of locations in the file LOCATION.LST which may be viewed, or accessed independently of the management control program. |
| TERMCOM.EXE | This part manages PC to terminal communication. |
| TERMPRM.EXE | This part displays and updates machine parameter information. It builds and manages a file called TERMKRM.DAT in which the parameters are kept. |

Created management control program Files

During operation of the management control program, data files are created, accessed, and updated. These include:

| | |
|---|---|
| LOCATION.GLB | This is a database file of all stored information for site locations. |
| LOCATION.LST | This is an ASCII text file, created from the LOCATION.GBL file when the list of locations is requested. It may be inspected or read by programs other than the management control program. The file contains all the locations in the database file. Locations are separated by a blank line. Each location consists of several lines of information as in this example: 0025 1200 Broadway Av. N.Y. |

-continued

| | |
|---|---|
| | 1 W 100 005 |
| | 2 D 100 005 |
| | The first line contains the location number followed by an address. Each of the following lines contains the following: Code - one digit, "1" or "2" Type - one letter, "W" or "D" Price - three digits Position - three digits |
| TERMPRM.DAT | This file contains the machine parameter class information. |
| REPORT1.DAT | This file is an ASCII file containing an Information report. It is created whenever this report is requested, but the printer is off line or not turned on. |
| REPORT2.DAT | Thig file is an ASCII file containing an Event report. It is created whenever this report is requested, but the printer is off line or not turned on. |
| TRANmmyy.DAT | Any number of transaction files are created when data is loaded into the PC. These, files contain the data collections that were collected by the hand-held terminals. The file names relate to the date of the transactions. "mmyy" represents four digits where: mm = the number of the month, 01-12 yy = the last two digits of the year, "89" = "1989" For example, the file TRAN0190.DAT holds the collected data for the month of January, 1990. |

CDL ASSEMBLY

Referring to FIG. 5, the heart of the CDL resides in micro-controller 10 which has four ports, three of which are used as input/output ports throughout the assembly. The fourth port, is comprised of two lines, PD0 11 and PD1 12; PD0 is this input to the communication circuit and PD1 is the output to the same circuit.

A 4 MHz oscillator 13 acts as the basic clock for the micro-controller. The micro-controller functions from potential $V_{DD}$ 14 which is supplied by a nickel-cadmium battery (discussed infra).

Amplifier 15 is employed to detect a significant drop in the backup battery voltage to 3.1 volts. If this occurs, the micro-controller goes to a reset state. The micro-controller starts up again with 3.4 volts.

A similar circuit 16 is intended to detect the external 12 volts from the power supply. As soon as the 12 volts disappears, line PD3 17 goes to a low logic level, at micro-controller input PD3 18, in order to halt normal processing and to enter a power-fail status. Resistors 19 and 20 precisely determine the level at which the 12-volt detector circuit 16 is to operate. Resistor 21 is a pull-up resistor for the PD3 line.

Device 22 is a counter, whose frequency is externally established with an oscillator circuit. This counter is intended to provide an interrupt over line 23 every half a second. The counter operates with a crystal 24 at a frequency of 32,768 Hz. Resistors 25A and 25B, along with capacitors 27 and 28, form part of the oscillator circuitry.

Every half a second, a pulse is provided by this crystal oscillator over output Q14 29, via amplifier 30. Diode 31 and resistor 32 form a clamping circuit. In order to obtain a very narrow pulse for interrupting the micro-controller, the output Q14 of the counter is very wide (250 milliseconds) and as a result must he made very narrow (less than 7 milliseconds) by capacitor 29 and resistor 33.

Figure 2:
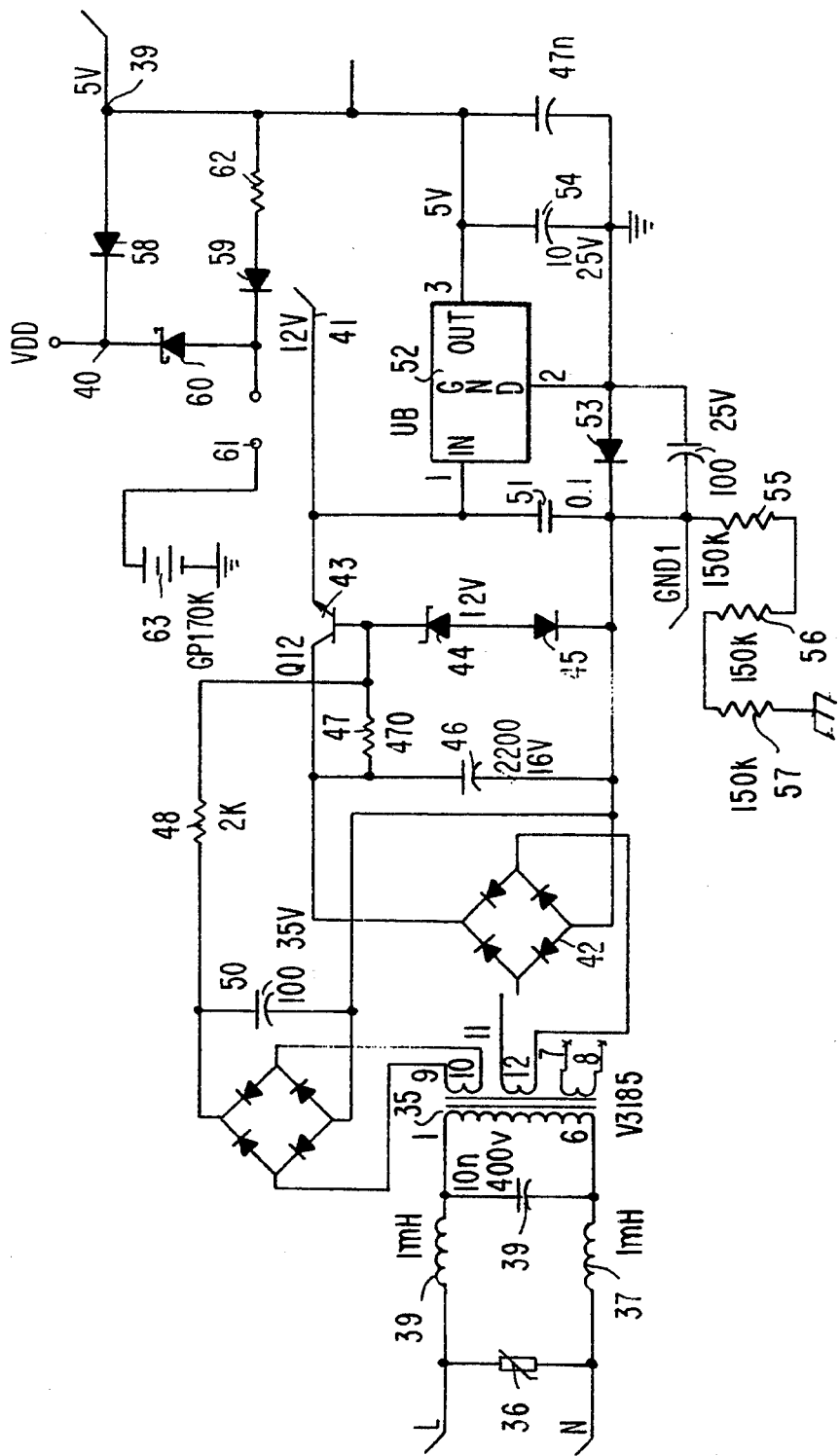
FIG. 2 is a schematic electrical diagram showing the power supply elements of the disposed embodiment.

Referring to FIG. 2, transformer 35 receives the line voltage (110 Vac) on its primary and generates two secondary voltages: 16.2 and 15.1 Vac. The input of the transformer is protected by a varistor 36 against power surges. Two chokes 37, together with capacitor 36, form a line filter.

The power supply produces three voltages:

5 volts 39, as the primary voltage for CDL operation, $V_{DD}$ 40, which is the battery sustaining voltage, 12 volts 41, used for operating the relays The 12-volt level is created by diode bridge rectifier 42 and series transistor 43. Regulation of this voltage is afforded by zener diode 44 and diode 45. Diode 45 compensates for transistor 43 emitter-base drop. Capacitor 46 is used to smooth the output of the diode bridge 42, prior to regulation. Resistor 47 provides the operating base potential for transistor 43.

So as to increase the operating range of transistor 43, a relatively higher potential is applied on its base. This potential is generated by rectifier bridge 49, filtered by capacitor 50 and fed to the base of the transistor via resistor 48. This auxiliary circuit allows the input voltage to the CDL assembly to drop and still provide sustaining voltage to the transistor base 43 for a 12-volt output.

The 12-volt output is further regulated down to 5 volts by regulator U8 52, whose input is filtered by capacitor 51. The common lead of the regulator 52 is connected via a diode 53 to ground, so as to obtain a potential difference of 0.6 volt between the 12-volt and 5-volt outputs. The output of the regulator is filtered by capacitor 54. Resistors R55–R57 provide for isolation and yet assure that the assembly is at the same potential as the machine on which it is installed. Diodes 58–60, jumper 61 and resistor 62, take care of maintaining a constant charge to the nickel-cadmium battery 63, as long as a 5-volt potential is present. During power failures, all micro-controller and components which must continue to operate, receive a sustaining voltage via jumper 61 and diode 60. Diode 58 prevents battery voltage from being drained by the 5-volt bus 39 and provides a slightly different potential difference between $V_{DD}$ 40 and 5-volt output 39, thereby assuring that during normal operation the battery is not used.

Figure 8:
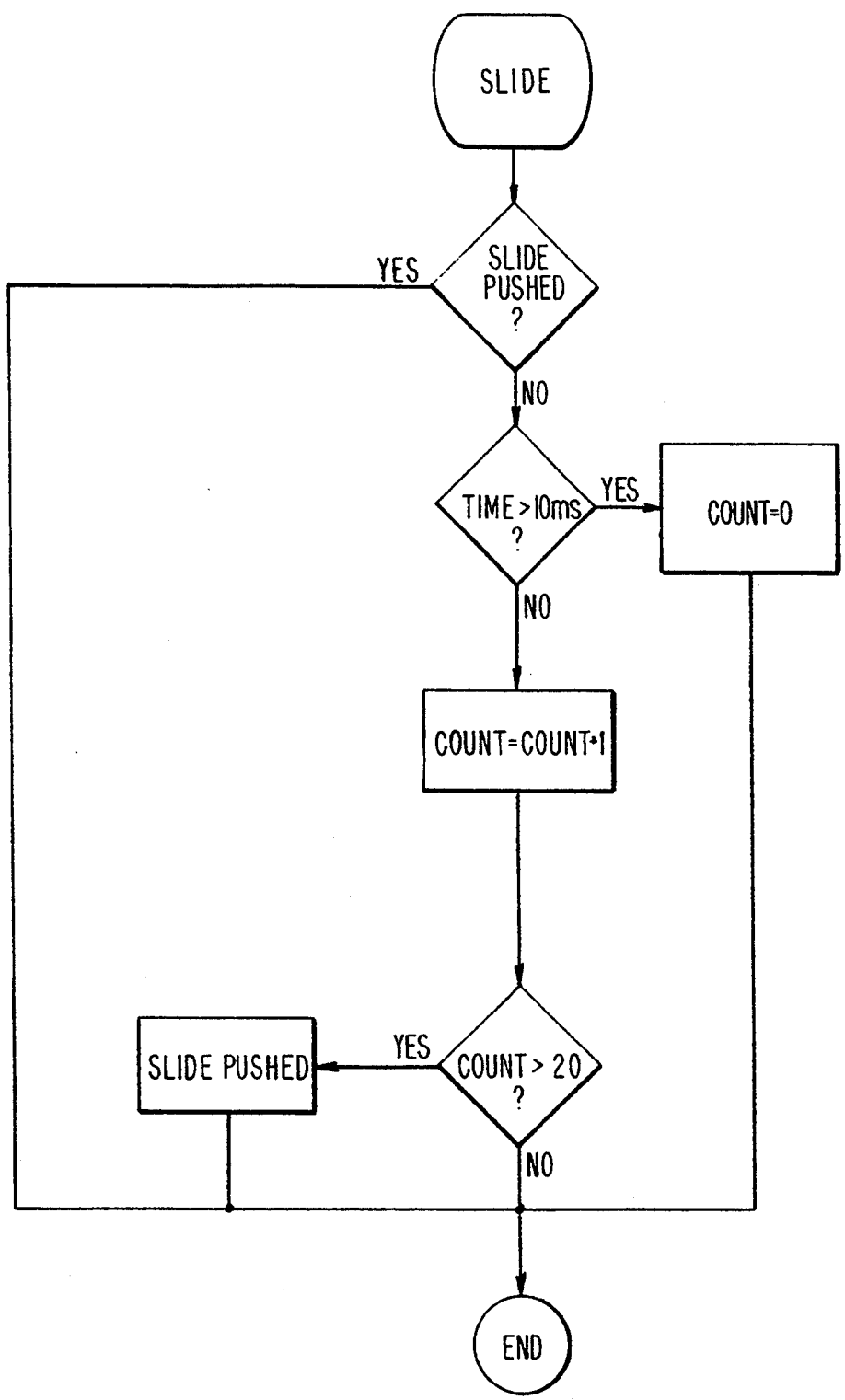

Referring to FIG. 8, connector 64 interconnects the assembly with all of the external sensors, as follows:

Pins 1 and 2 connect to the SERVICE DOOR switch;

Pins 3 and 4 connect to the VAULT switch.

Pins 5 and 6 connect to the mode selector in the machine, ~for HOT WASH.

Pins 7 and 8 connect the mode selector in the machine, for COLD WASH.

Note: for warm wash, both switches in the machine are enabled.

The optical sensor, for coin recognition, is connected to pins 9 and 10 (light emitting diode), and 11 and 12 (phototransistor).

Pin 9 receives 12 volts from the supply, via resistors 65 and 66.

Capacitor 67 acts as a filter capacitor for this line. The cathode of the photodiode receives pulses via resistor 68. The pulses appear at a 3-millisecond rate at line LED K 69 through buffer U2 71 (refer to FIG. E2) at line LED K 70 via line TCMP.

This line originates from micro-controller 10 at output TCMP 72 (refer to FIG. E1)

The phototransistor receives also a 12-volt potential via resistor 74 to pin 12 of the connector 64. Capacitor 75 filters any noise or spikes on the line. Pulses P1 73 are amplified by transistor 76 to input TCAP 77 of micro-controller 10, which is used for measuring the time it took for the pulse from TCMP to arrive at the micro-controller.

Under standby conditions, the pulse generated every 3 milliseconds by TCMP 72, appears back at the input of the micro-controller at TCAP 77, also every 3 milliseconds. Once a coin is inserted into the machine, pulses are not received back, until the coin drops out of the way. The number of pulses missing while the coin is dropping, is relative to the diameter of the coin. Thus, only coins which are allowed to be used will be counted as genuine. Resistors 78–80 and capacitors 82 and 83 form a filter network which cleans-up noises from the P1 line 73. Resistor 81 serves as a biasing resistor for transistor 76.

Referring to FIG. 8, the SERVICE DOOR switch enters the assembly via PB4 84 and resistor 85. Resistor 86 provides for a constant logic 1 level through $V_{DD}$, all the time that the door switch is open. Capacitor 87 is a simple filter for the PB4 line.

The same approach is taken for the VAULT DOOR switch, at PB5 92, via resistor 93. Resistor 95 provides a constant logic 1 level, as long as the vault door switch is open. Capacitor 96 is a simple filter for PB5 line.

Note that even during a power failure, both switches will be powered via the nickel-cadmium battery $V_{DD}$ potential, should an attempt be made at opening either door. Integrated circuit 22, as previously mentioned, provides an interrupt IRQ 23 to the micro-controller 10, every half-a-second. The SENSOR line 88, from the input connector 64, and 89 on FIG. E2, receives negative-going pulses every half-a-second.

By providing short pulses every half-a-second, the circuitry draws very little current from the battery, thus allowing the assembly to operate during power breaks of up to three months. The micro-controller 10 provides, via PC3 90, these very short pulses through resistor 91 and transistor 92. When the pulses are fed to PC3, the SENSOR line drops to a logic 0 level. Since the SENSOR line is common to both the vault and service door switches (pins 1 and 3 of connector 64), both the VAULT DOOR and SERVICE DOOR lines are sampled for switch status (open/closed).

Regarding the temperature sensors for the hot/cold switches set by the customer. Note that these switches are not operated during power failures, thus there is no need to back-up their operation or record operation times during power breaks. Therefore, the circuitry involving these switches is directly connected to the +5 Vdc output 39 of the power supply. The temperature switches obtain a ground return via resistor 97 through pins 5 and 7 of connector 64.

The two temperature input circuits are identical in design and operation. Resistors 98/99 are input isolation resistors, while resistors 104, 105/106, 107 are used to bias transistors 100/101, which are configured as common emitters. Capacitors 108/109 are filters for the input lines. The outputs to the microprocessor 10 are PB7 102 for the HOT WASH and PC7 103 for the COLD WASH. Having both lines to ground gives a warm temperature (hot+cold).

Figure 7:
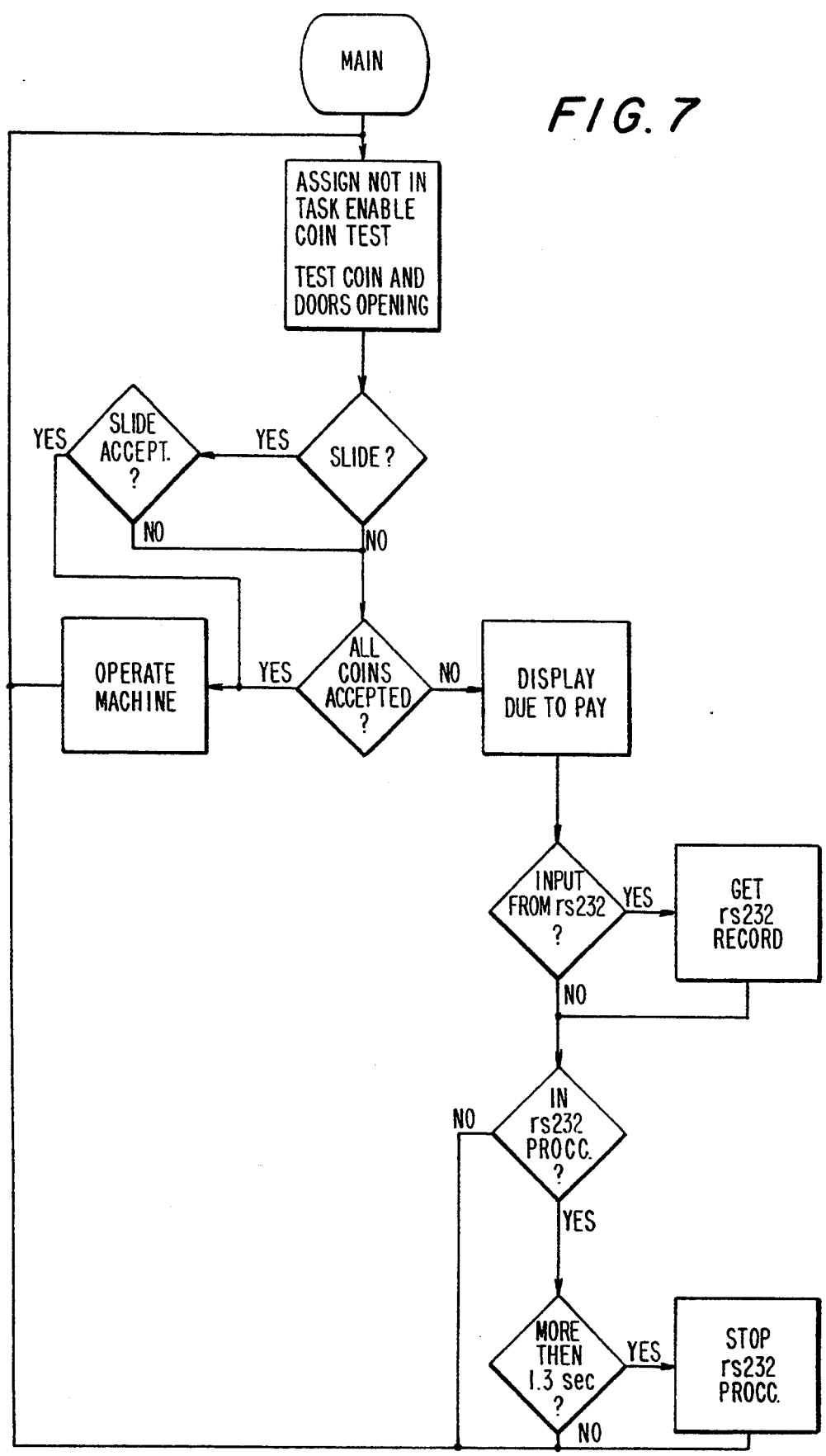

Referring to FIG. 7, the assembly also includes additional sensor inputs for water level and lid opening.

Since these lines are at high voltages (110 Vac), optical isolation is provided. The specific units are:

LEVEL 1
LEVEL 2
LID

LEVEL 1 and 2 are used for more sophisticated washing machines where the water level may be adjusted for savings. This is an option in the usage, as LEVEL 1 is normally the only sensor used.

Resistor 110 drops the input voltage (110 Vac) and provides isolation for the circuit. The ac voltage is rectified by two diodes 112 and 113 to provide a dc input to optocoupler 114. Since the output of the optocoupler is in the shape of a square wave, a large size electrolytic capacitor 117 is connected to its output PD2 115. Resistor 116 is a pull-up resistor for the PD2 output to the micro-controller.

The other two sensing circuits, 118 and 119 are identical to the LEVEL 1 circuit described. All three circuits have a common resistor 111 connected to the neutral of the ac lines for the sensors.

Figure 6:
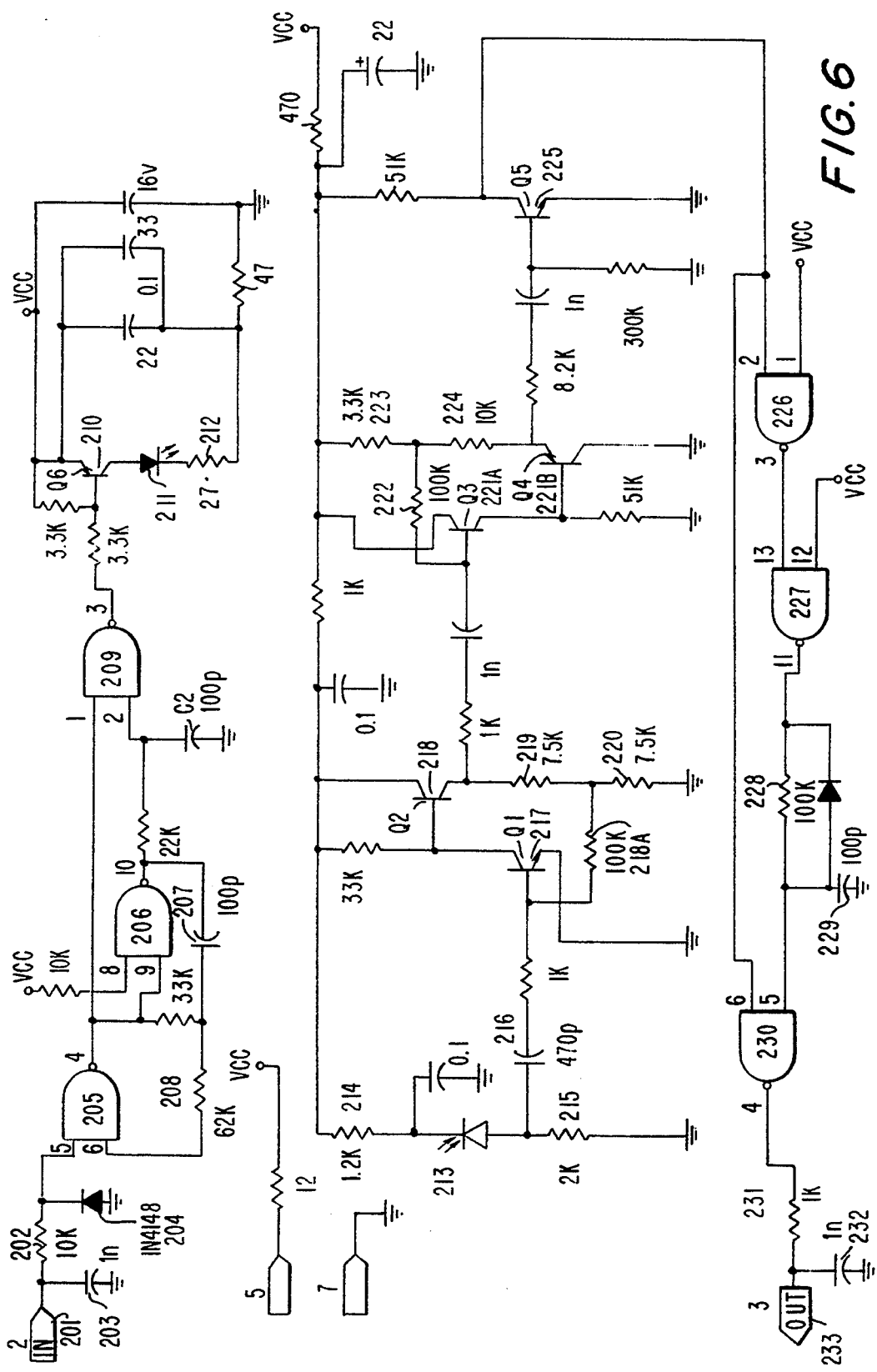

Referring to FIG. 6, Connector 120 is the interface connector between the control PCB and the display PCB. At this connector a buffer circuit 121 provides isolation and drive for all seven segments of the display indicators. The outputs of the buffer 122 are routed to the micro-controller pin ports PA0 thru PA6 (7 lines). Each one of the outputs of buffer 121 has a series resistor 123 for isolation. Each of the three seven-segment displays are enabled by the micro-controller via PC3 124, PB2 125 and PB1 126. The three outputs of buffer 71 are routed through drives Q2-Q4 127-129 to lines SD1-SD3 130-132, to connector 120, then to the display PCB.

For the decimal point of the display BP, port PB0 130 is activated.

Buffer 131A is used as the driver for external relays. The buffer handles 7 relays (SK1-SK7), with an additional relay driven from buffer 71, SK8 output 132A.

Figure 4:
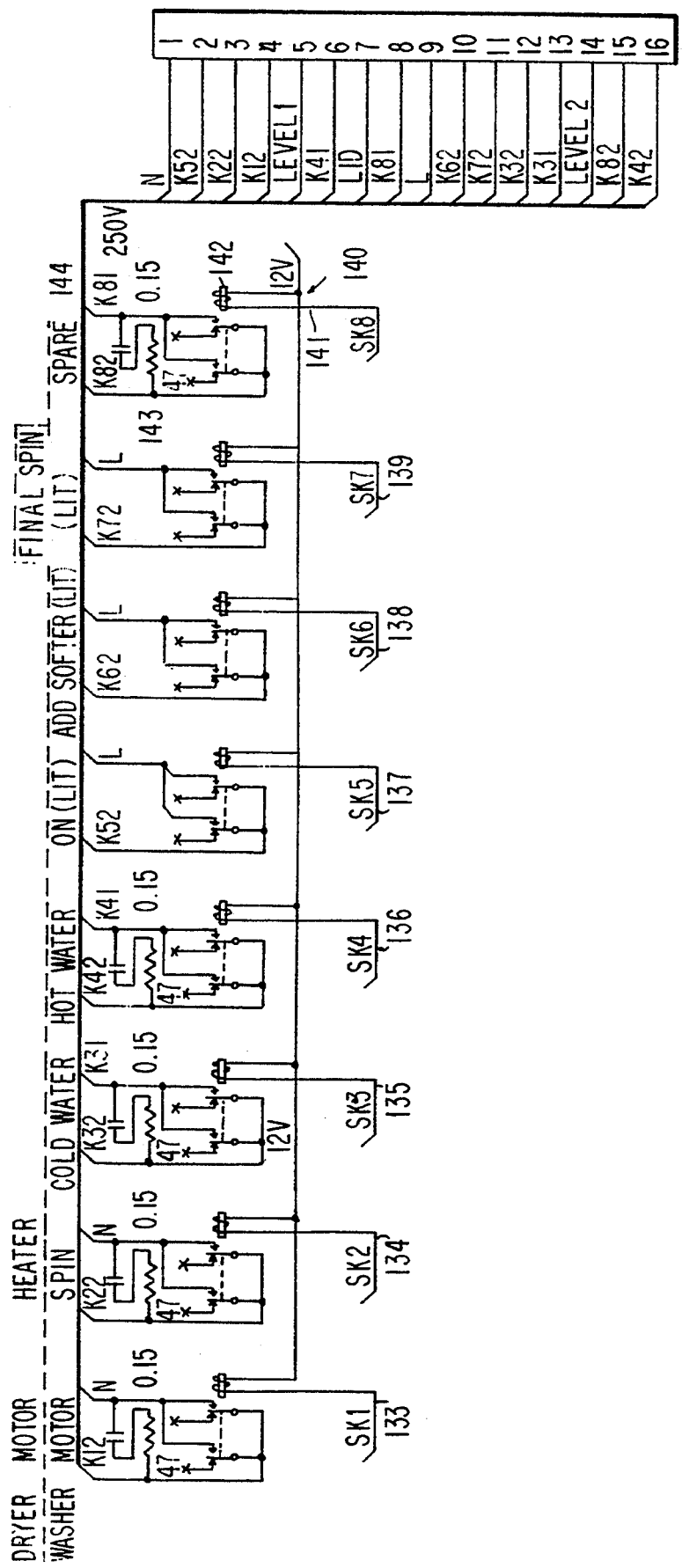
FIG. 4 is a schematic electrical diagram showing relay circuitry.
Figure 5A:
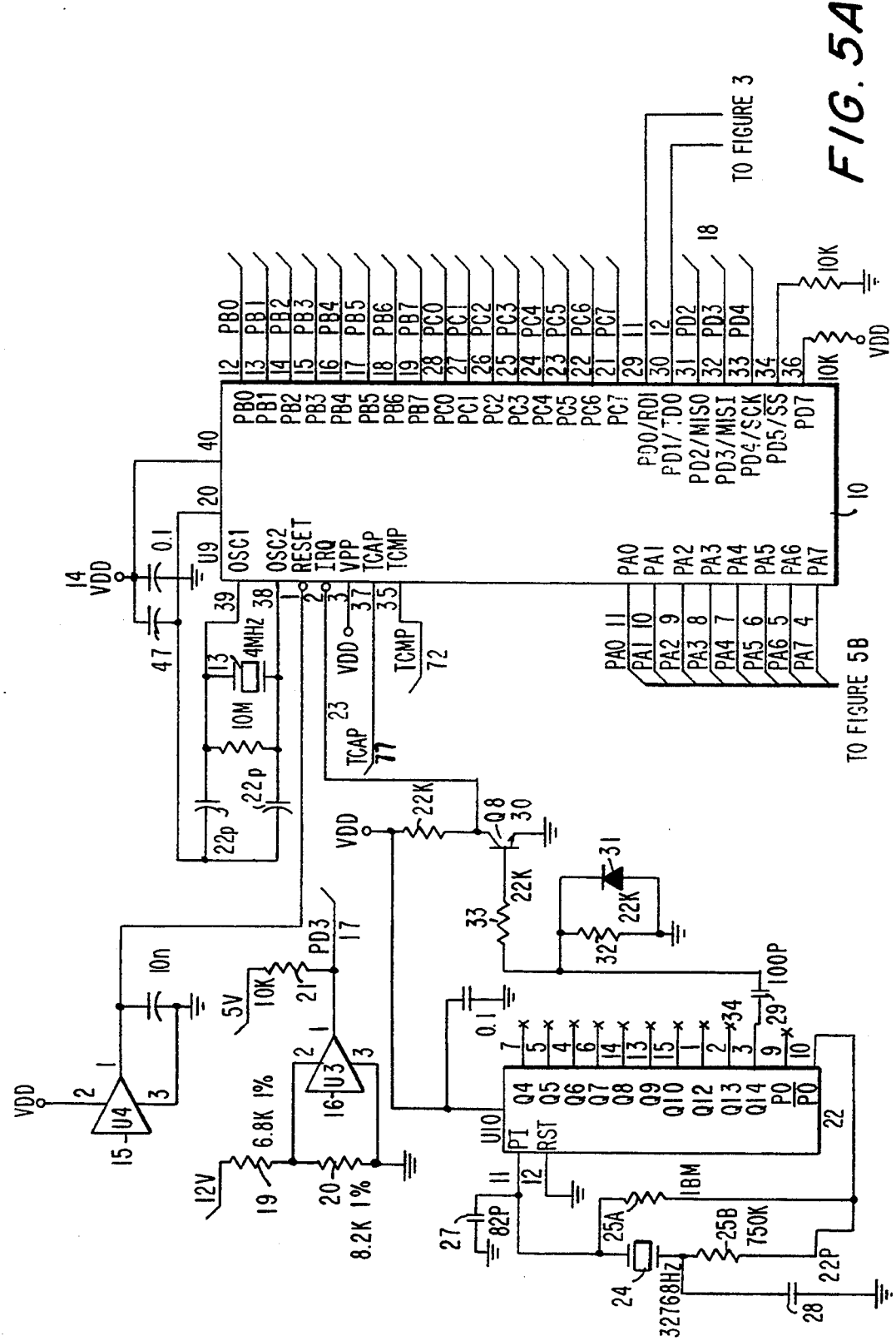
FIGS. 5 through 8 is a schematic wiring diagram representing a schematic electrical assembly view.
Figure 5B:
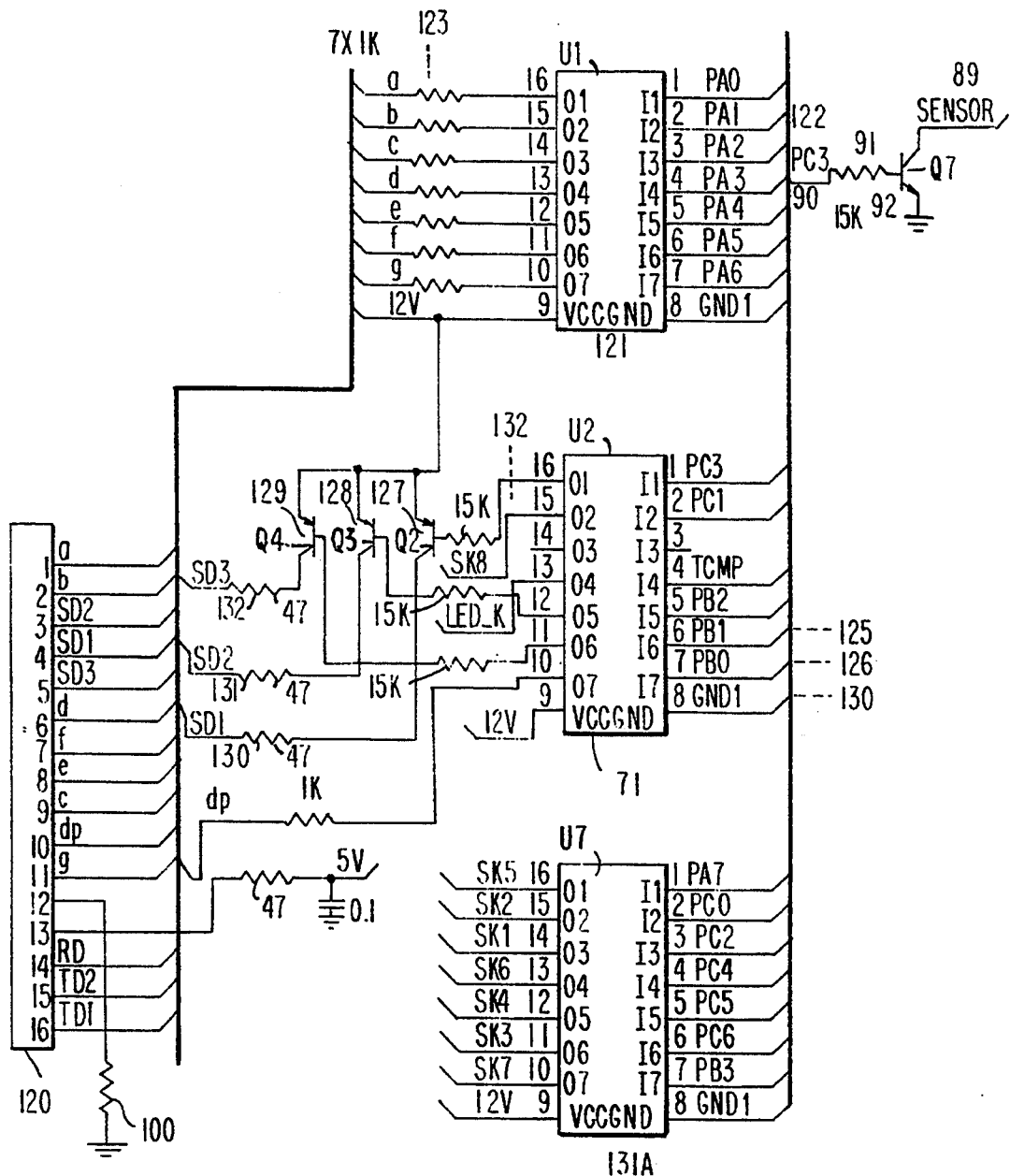
Figure 5C:
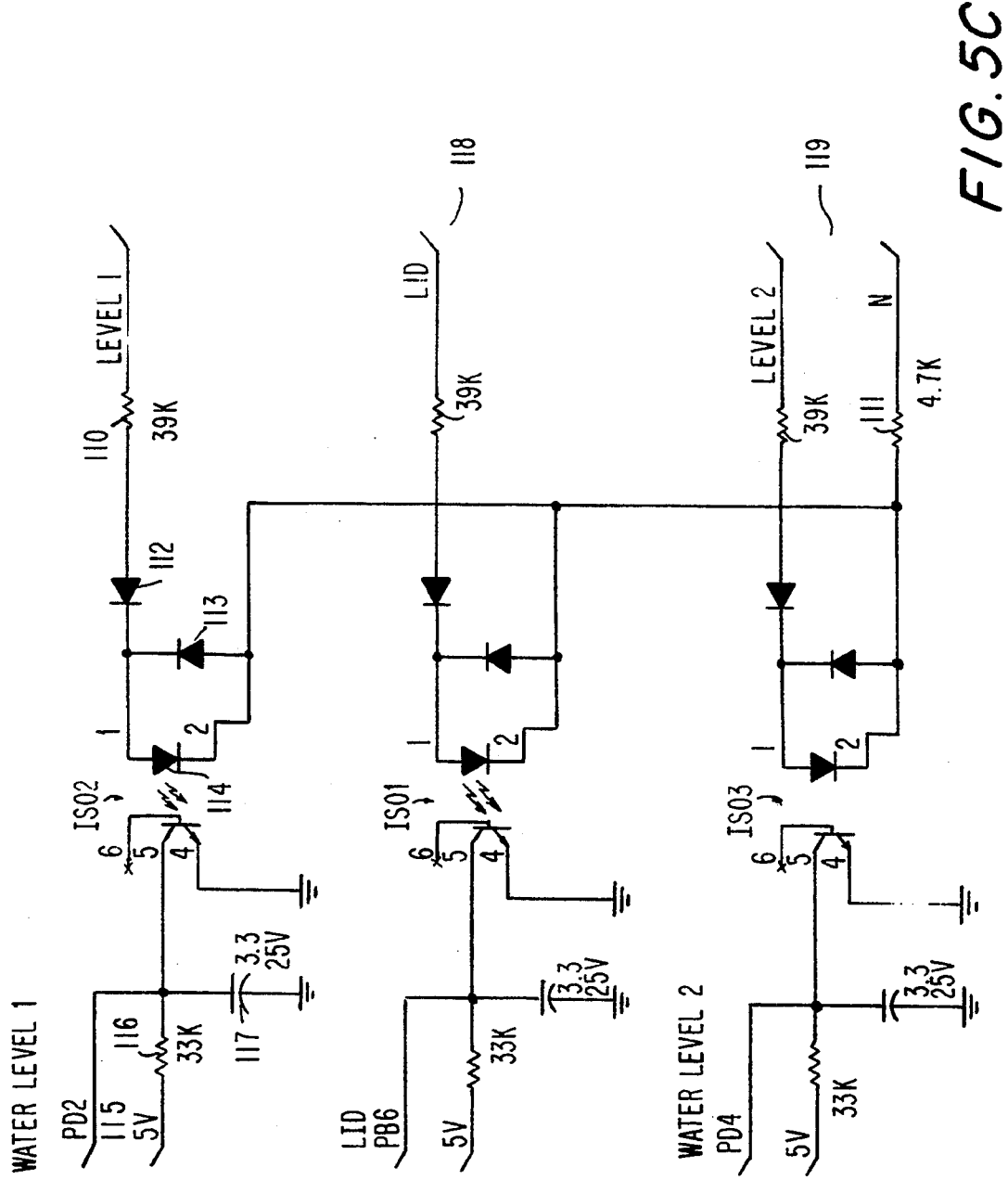
Figure 5D:
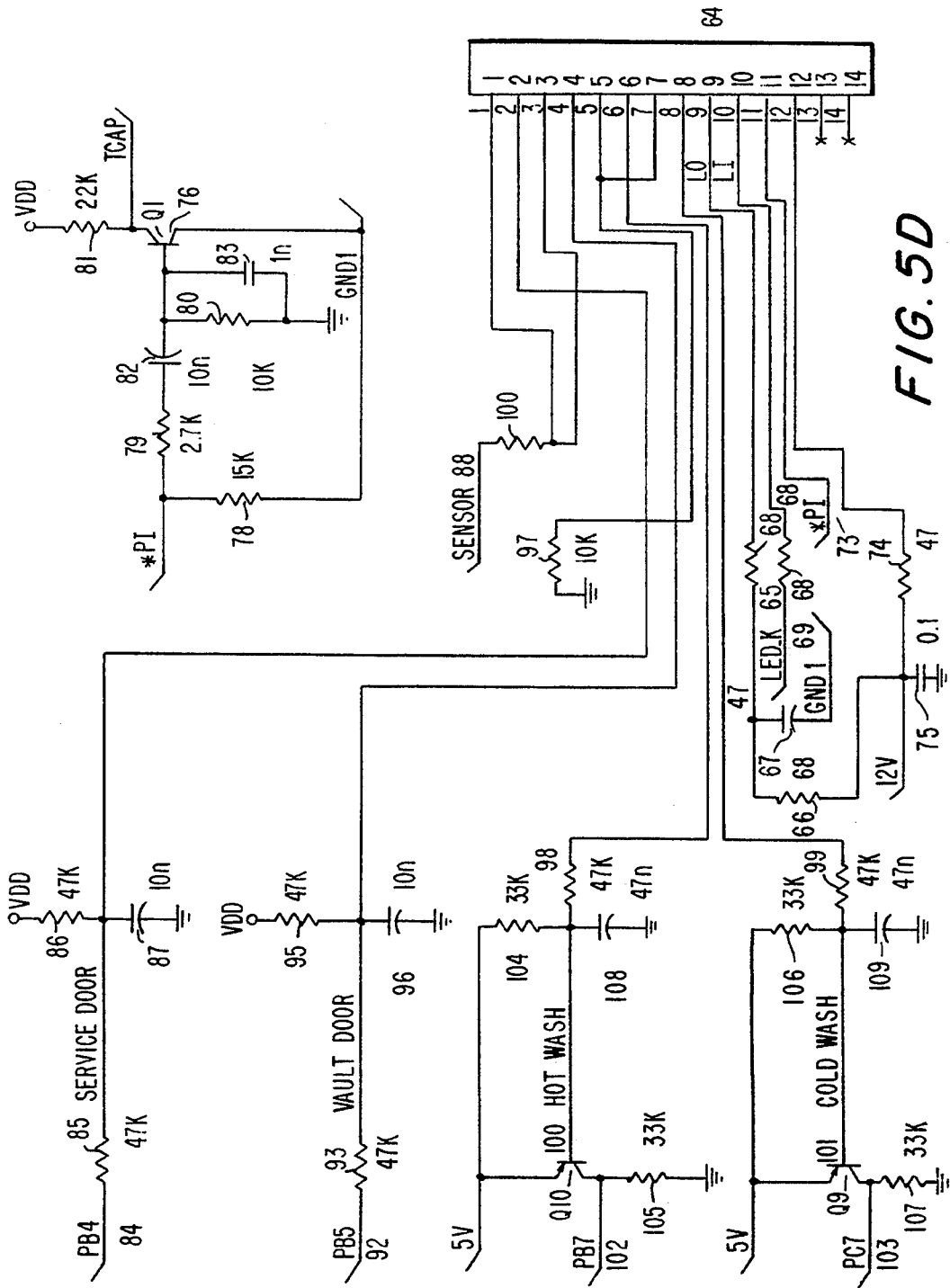

Referring to FIG. 4, the relay circuitry is composed of eight identical circuits. The SPARE circuit is described hereafter.

One side of the relay coil 142 receives continuous 12 Vdc 140. The relay is operated when the SK8 line 141 is at a low logic level, resulting from the related buffer driver being enabled by the micro-controller. The relay 142 is a double-pole, double-throw relay, with contacts wired parallel for higher current handling, in a small package. Resistor 144 and capacitor 137 are used for spike suppression on some of the high-Current relays.

Relay circuits 133 thru 139 are identical in configuration.

Referring to FIG. 1, the display circuitry is shown on this figure and is figured physically on a separate assembly. The three displays 145-147 are connected to input connector 148, via lines a-g ~and DP. The displays are enabled, one at a time, by lines SD1-SD3.

The remainder of the assembly consists of a communication circuit for sending and receiving of data from a handheld terminal.

Figure 3:
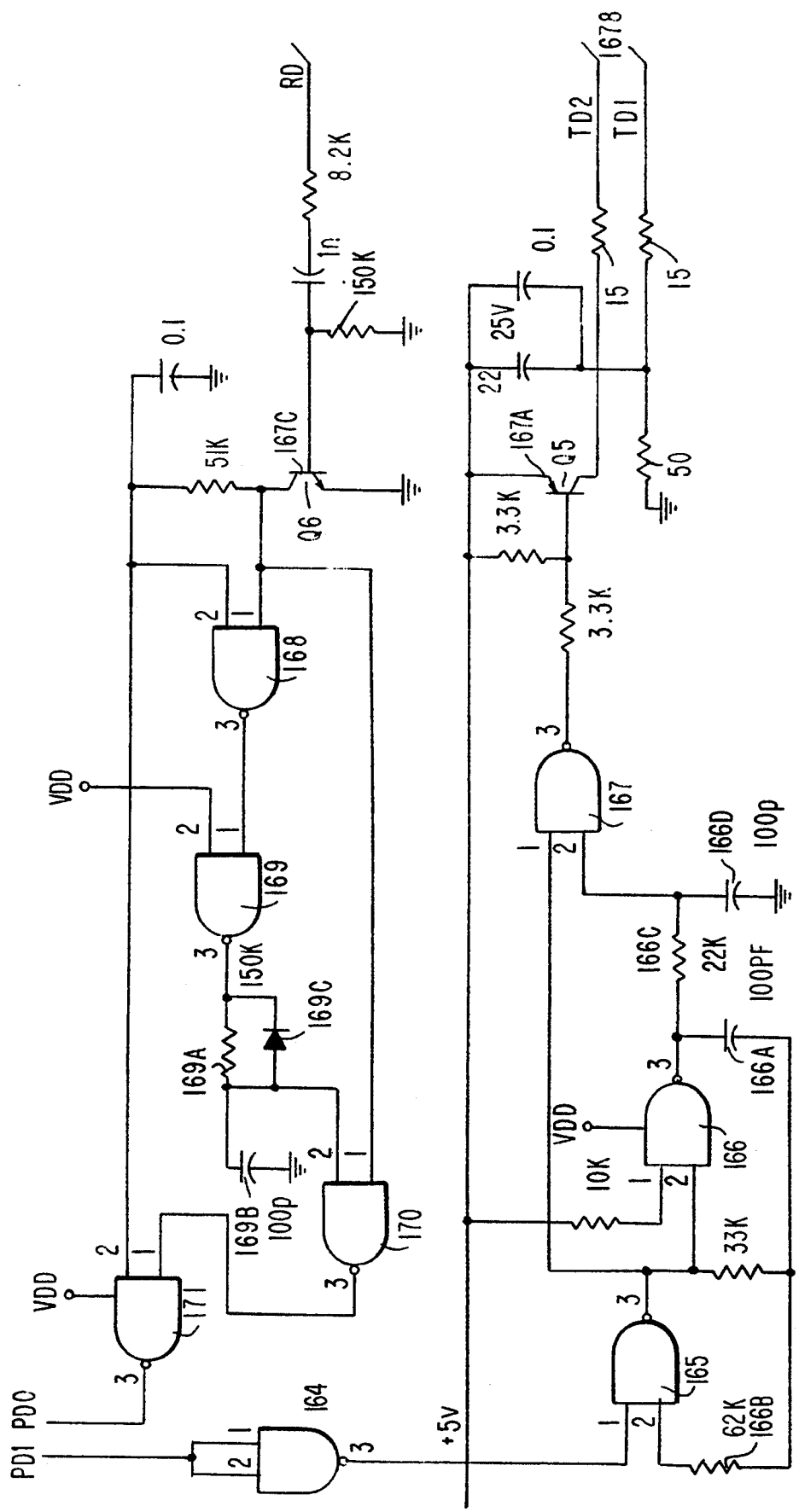
FIG. 3 is a schematic electrical diagram of a communication circuit and associated logic.

The transmit side of the circuit is handled by a light emitting diode 149, which is powered by the logic circuitry described hereafter (FIG. 3). The data reception side of the circuit consists of a photo-diode 150 and biasing resistors 151 and 152. Capacitor 153 is a dc block for transistor 154 input circuit. Transistors 154 and 155 form a negative-feedback bootstrap configuration for high linearity and stability in the amplification. Negative feedback is provided by resistor 156 and voltage divider network 157 and 158. Since the bootstrap amplification circuit is characterized by a low gain figure, a second stage 159/162 is used. Negative feedback is provided by resistor 161 and voltage divider 162/163. The amplified and very stable data is applied to a logic circuit, described hereafter (FIG. 3), via pin 14, RD, of connector 148.

Referring FIG. 3, signal PB1 is the output from the micro-controller 10 to the communication circuit logic. The data is first inverted by NAND gate 164 prior to being applied to 125 kHz oscillator stage formed by NAND gates 165 and 166. The oscillator is enabled by the a high logic PD1 signal (after the inversion by 164) at gate 165 input. The oscillator frequency is established by an RC feedback network composed of a capacitor 166A and a resistor 166B. Thus, every time a positive data level enables the oscillator, a burst of narrow pulses is fed to NAND gate 167 which then drives transistor 167A into saturation. This transistor is series-connected with the light emitting diode in the display circuit, via TD1 and TD2 lines. The approach taken for transmission saves power when the circuitry operates from the back-up battery, during power failures.

On the reception side of the communication circuit, the RD line originating from the display circuit, is applied to a matching circuit, prior to being fed to transistor 167C. The output of the transistor is routed straight to one of NAND gate 170 inputs, while the same signal is routed through an integrating circuit composed of NAND gates 168 and 169, resistor 169A and capacitor 169B. The circuit receives 125 kHz pulses from the handheld terminal and routes these pulses via two inverters 168 and 169. These two gates slow down the pulses relative to the straight path. Pulses are then integrated by the resistor/capacitor combination. During the integration process NAND gate 170 output is kept at a low logic level until the pulses burst is complete. Then the NAND gate goes to a high logic level. The high logic level is inverted by NAND gate 171, providing a low logic level to the micro-controller input PD0.

INFRA-RED ADAPTOR

Figure 9:
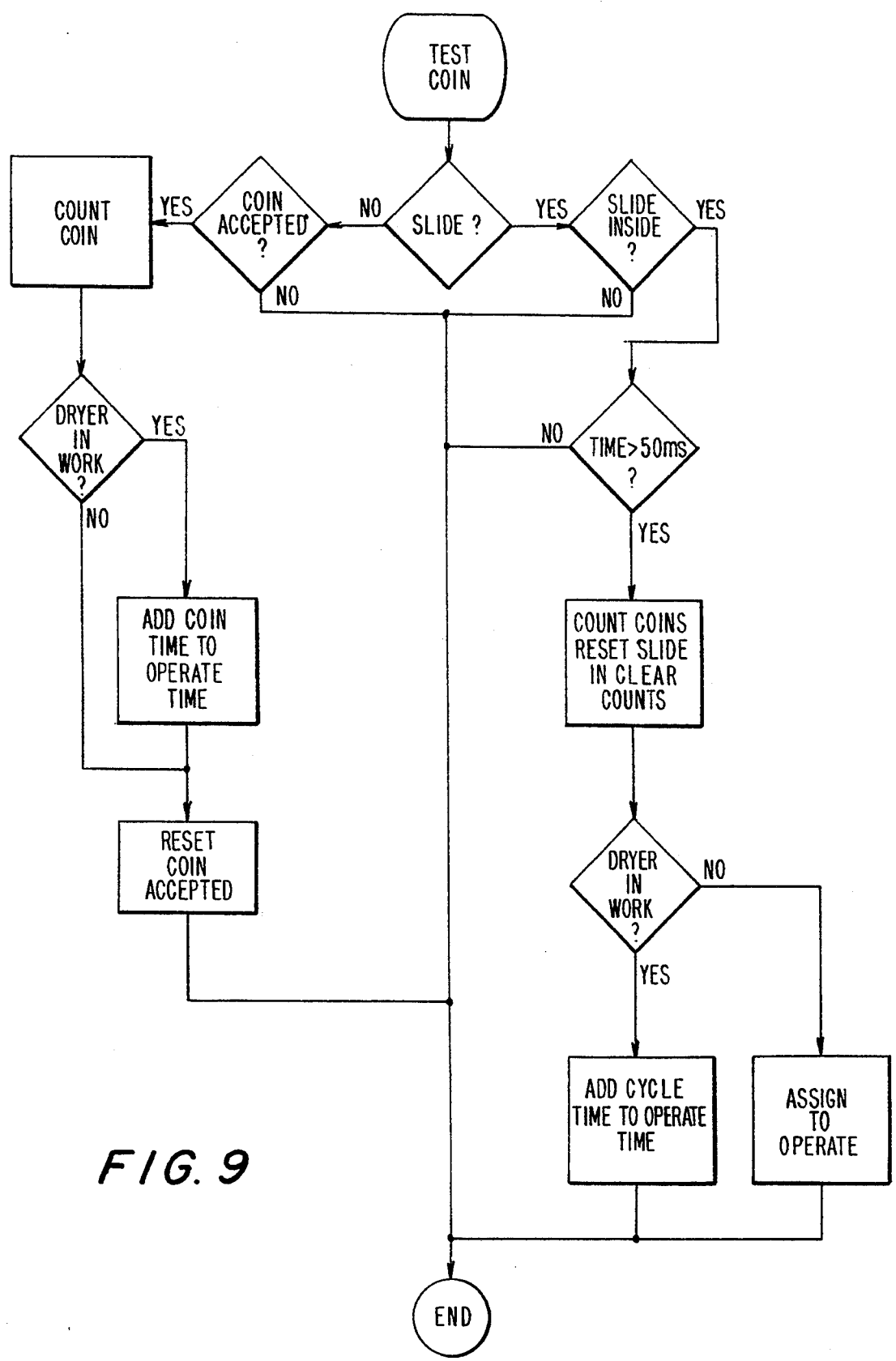
FIG. 9 is a schematic electrical diagram of an infra red adaptor forming part of the embodiment.
Figure 10:
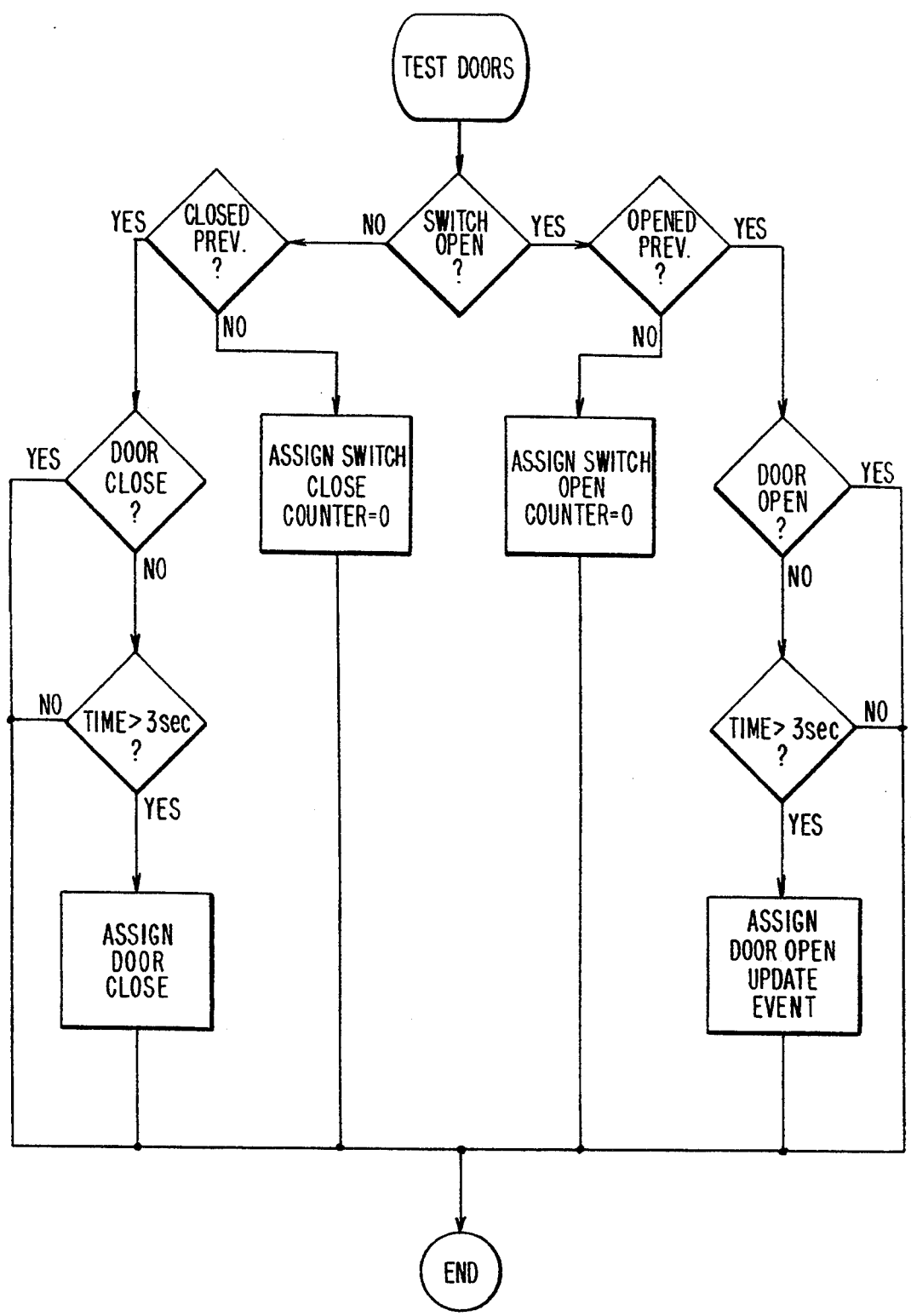
Figure 11:
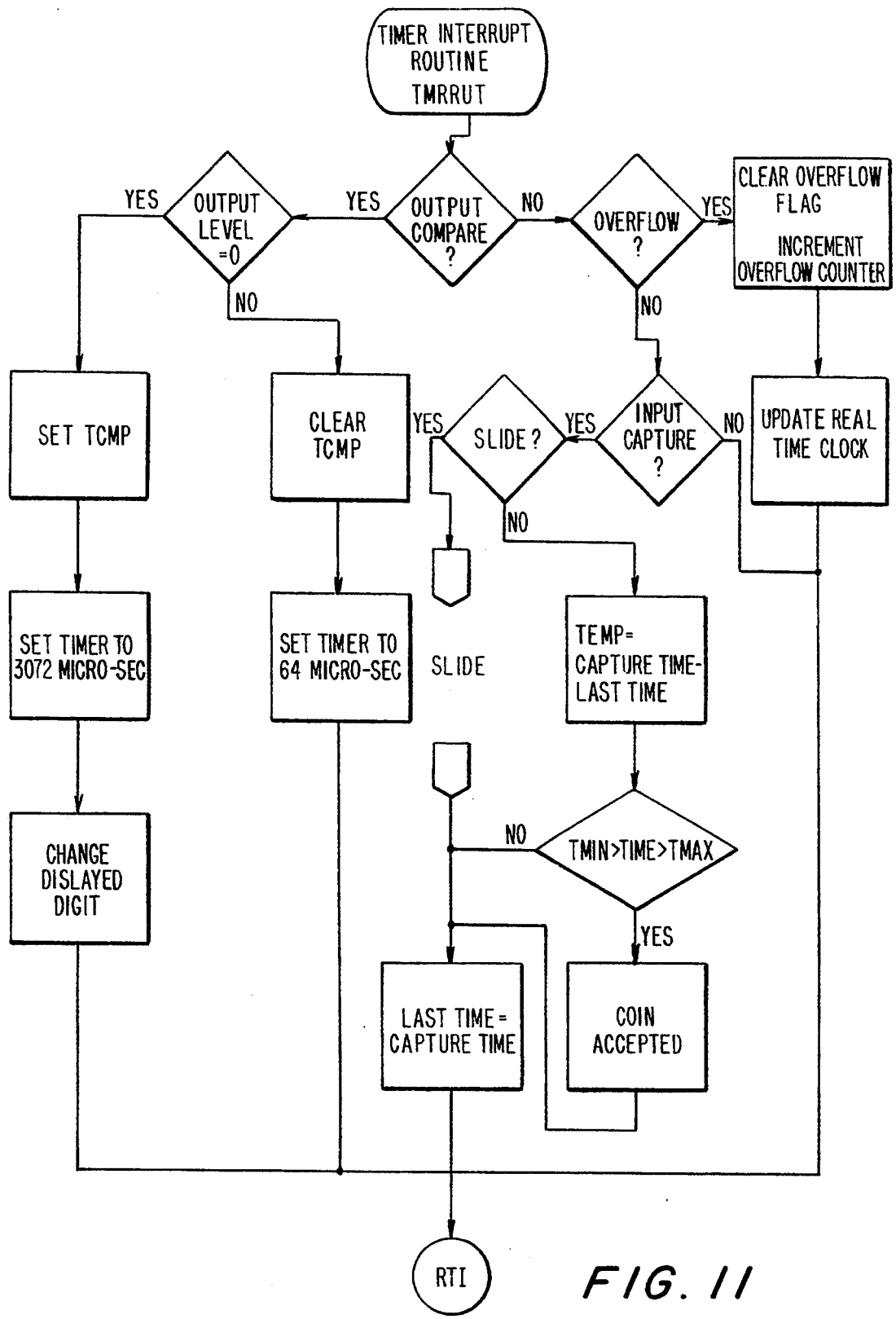
Figure 12:
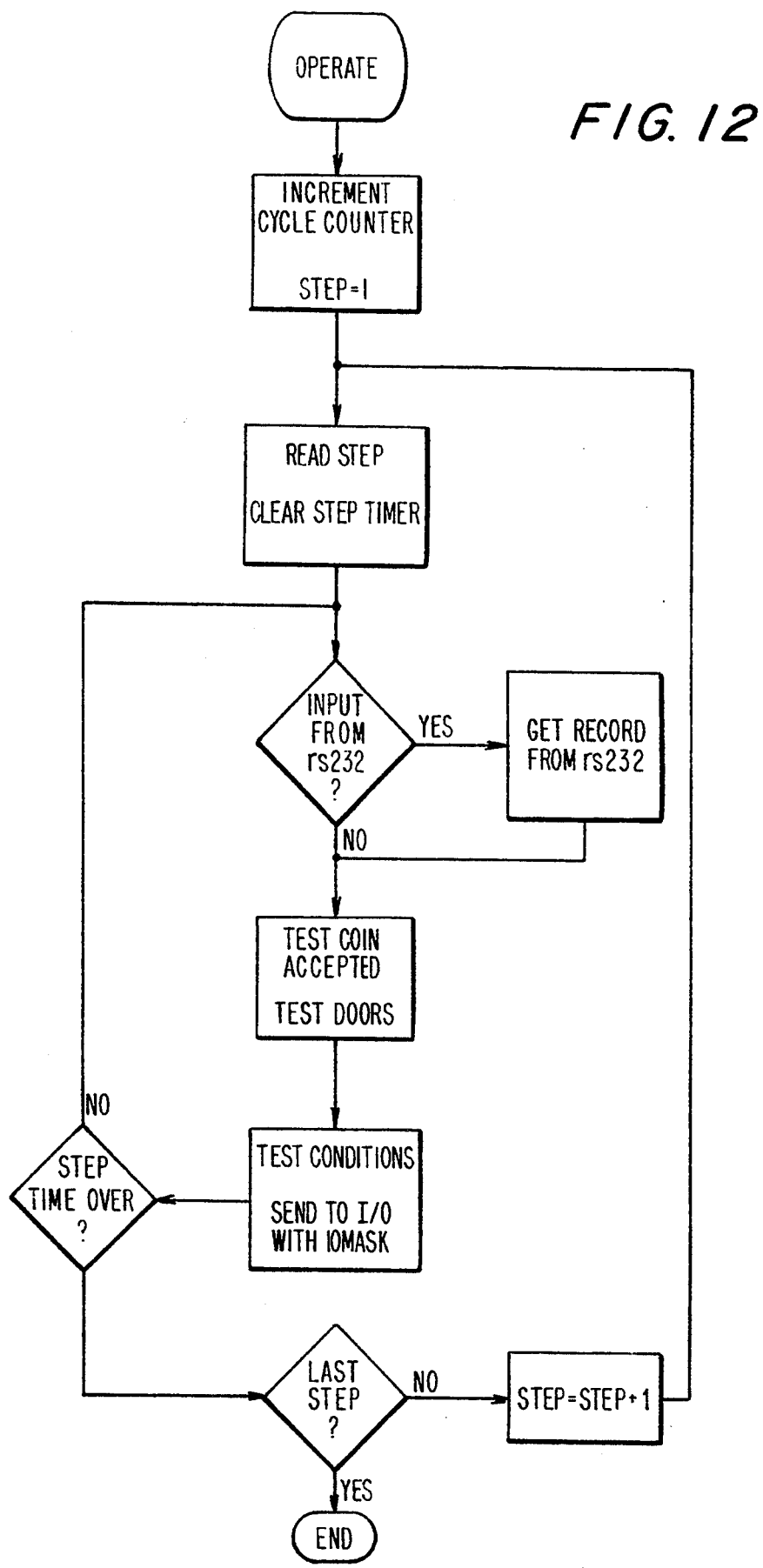

Referring to FIG. 9, the infra-red adaptor is plugged on to a hand-held terminal and is used to transmit/receive data to/from the ELC assembly located in the laundry machine. Operating power for the adaptor is derived from the hand-held terminal, at pin 5 200 of the interface connector.

On the transmit side of the adaptor data from the hand-held terminal is applied to the adaptor at pin 2 201. In order to ensure that the data is free of noise, a filter composed of resistor 202 and capacitor 203 are placed on the input line. Diode 204 is a clamping diode for negative levels. NAND gates 205 and 206 form a 125 kHz oscillator stage. The oscillator is enabled by a high logic signal at gate 205 input. The oscillator frequency is established by an RC feedback network composed of a Capacitor 207 and a resistor 208.

Thus, every time a positive data level enables the oscillator, a burst of narrow pulses is fed to NAND gate 209, which then drives transistor 210 to saturation. This transistor is series-connected with the light emitting diode 211. Resistor 212 is a current limiting resistor for the light emitting diode. The approach taken for transmission matches the modulation scheme of the ELC assembly in the laundry machine.

On the receive side of the adaptor, photo-diode 213 is biased by a divider network composed of resistors 214 and 215. Capacitor 216 is a dc blocking capacitor for a transistor 217 input circuit. Transistors 217 and 218 form a negative-feedback bootstrap configuration for high linearity and stability in the amplification. Negative feedback is provided by resistor 218A and voltage divider network 219/220. Since bootstrap circuits are characterized by a low gain figure, a second stage 221A/221B is used. Negative feedback is provided by resistor 222 and voltage divider 223/224.

The amplified and very stable data is applied to a matching circuit, prior to being fed to transistor 225. The output of transistor 225 is routed directly to one of the NAND gate 230 inputs, while the same signal is routed through an integrated circuit composed of NAND gates 226 and 227, resistor 228 and capacitor 229.

The circuit receives 125 kHz pulses from the hand-held terminal and routes these pulses via two inverters 226 and 227. These two gates slow down the pulses relative to the straight path. Pulses are then integrated by the resistor/capacitor combination. During the integration process NAND gate 230 output is kept at a low logic level until the pulse burst is complete. Then the NAND gate goes to a high logic level. Resistor 231 and capacitor 232 form a filter for the adaptor output to the hand-held terminal at pin 3 233 of the connector.

Modulation Scheme

The modulation scheme used both in the infra-red adaptor and in the ELC assembly is one and the same. The infra-red transmission is based on RS-232 communication protocol, where constant logical zeros mean that the physical line is in constant voltage. Only for the first change from logical zeroes to a logical one will the receiver start to synchronize on the start bit.

In the infra-red communications method used, constant logical zerioes imply no pulses are being transmitted. Once a high logic level is sent first by the hand-held terminal, then via infra-red by the adaptor, a stream of pulses is received by the infra-red receiver in the ELC assembly.

The repetition rate of the pulses is 8 midroseconds (125 kHz) and each pulse has a nominal 2-microsecond width.

I wish it to be understood that I do not consider the invention to be limited to the precise details of structure shown and set forth in this specification for obvious modifications will occur to those skilled in the art to which the invention pertains.

I claim:

1. In a management system for coin operated laundry machines at individual locations in which individual laundry machines operate through a cycling of operational circuits in response to an insertion of coins into a coin collecting means, the system including a data transfer means associated with each machine, a hand-held terminal for receiving and transmitting data from and to individual machines, and a central computer for receiving and transmitting data from and to said hand-held terminal for processing, said machines operating through distinct operating cycles in accordance with a timing mechanism, the improvement comprising: a circuit board installed within each machine and interconnected between said coin collecting means and said operational circuits, said circuit board having storage facilities for both operational parameters and coin auditing data, said hand-held terminal having means for transmitting information to vary any of said operational parameters and for receiving data relative to said coin auditing; said operational parameters including the number of coins required to initiate a cycle of operation, the operating time of said cycle of operation, and the length of time required between the completion of an operating cycle and the commencement of a following cycle.

2. The improvements set forth in claim 1, in which said terminal includes means for stopping a machine cycle before completion for verifying a transfer of a newly inserted parameter.

* * * * *